(12) United States Patent
Ikeda

(10) Patent No.: US 11,341,733 B2
(45) Date of Patent: May 24, 2022

(54) METHOD AND SYSTEM FOR TRAINING AND USING A NEURAL NETWORK FOR IMAGE-PROCESSING

(71) Applicant: CANON KABUSHIKI KAISHA, Tokyo (JP)

(72) Inventor: Motoki Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 16/710,661

(22) Filed: Dec. 11, 2019

(65) Prior Publication Data

US 2020/0202155 A1    Jun. 25, 2020

(30) Foreign Application Priority Data

Dec. 19, 2018 (JP) ............................. JP2018-237512

(51) Int. Cl.
| | |
|---|---|
| *G06K 9/20* | (2006.01) |
| *G06K 9/00* | (2006.01) |
| *G06K 9/62* | (2006.01) |
| *G06V 10/22* | (2022.01) |
| *G06V 30/414* | (2022.01) |
| *G06V 30/10* | (2022.01) |

(52) U.S. Cl.
CPC ........... *G06V 10/22* (2022.01); *G06K 9/6256* (2013.01); *G06V 30/414* (2022.01); *G06V 30/10* (2022.01)

(58) Field of Classification Search
CPC ............. G06K 9/2054; G06K 9/00463; G06K 9/6256; G06K 2209/01; G06K 9/00442; G06K 9/00456
See application file for complete search history.

(56) References Cited

U.S. PATENT DOCUMENTS

| | | | | |
|---|---|---|---|---|
| 10,764,448 | B1* | 9/2020 | Nakamura | ......... H04N 1/00331 |
| 2007/0239632 | A1* | 10/2007 | Burges | ................... G06N 20/00 |
| | | | | 706/15 |
| 2008/0144131 | A1* | 6/2008 | Jung | .................. H04N 1/32133 |
| | | | | 358/474 |
| 2008/0240569 | A1* | 10/2008 | Tonouchi | ............... G06V 30/32 |
| | | | | 382/186 |

(Continued)

FOREIGN PATENT DOCUMENTS

JP          6140946 B2     6/2017

OTHER PUBLICATIONS

Jia, W., et al. "A CNN-based Approach to Detecting Text from Images of Whiteboards and Handwritten Notes", 2018 16th International Conference on Frontiers in Handwriting Recognition (ICFHR), 2018, pp. 1-6.

(Continued)

*Primary Examiner* — Ming Y Hon
(74) *Attorney, Agent, or Firm* — Canon U.S.A., Inc. IP Division

(57) ABSTRACT

An image-processing system that can perform predetermined image processing on a manuscript character in a captured image is provided. A method for image processing includes training a neural network using composite image data including a background image and a manuscript image and correct image data corresponding to the composite image data, obtaining a captured image of an original that contains a manuscript character, and performing predetermined image processing on the captured image using the neural network.

17 Claims, 36 Drawing Sheets

(56) References Cited

U.S. PATENT DOCUMENTS

| | | | |
|---|---|---|---|
| 2010/0095204 A1* | 4/2010 | Kobayashi | G06F 40/103 715/700 |
| 2010/0309527 A1* | 12/2010 | Mandalapu | H04N 1/32529 358/402 |
| 2015/0131918 A1* | 5/2015 | Baitsan | G06V 30/224 382/229 |
| 2016/0012286 A1* | 1/2016 | Sugiura | G06V 30/36 382/187 |
| 2016/0125633 A1* | 5/2016 | Windmark | G06T 3/4038 382/103 |
| 2018/0005058 A1* | 1/2018 | Yang | G06V 30/153 |
| 2021/0056336 A1* | 2/2021 | Ikeda | G06N 3/08 |

OTHER PUBLICATIONS

Jia, W., et al. "A Robust Approach to Detecting Text from Images of Whiteboards and Handwritten Notes", 2017 14th IAPR International Conference on Document Analysis and Recognition (ICDAR), 2017, pp. 813-818, vol. 1.

Renton, G., et al. "Handwritten text line segmentation using Fully Convolutional Network", 2017 14th IAPR International Conference on Document Analysis and Recognition (ICDAR), 2017, pp. 5-9, vol. 1.

Jaderberg, M., et al. "Synthetic Data and Artificial Neural Networks for Natural Scene Text Recognition", abs/1406.2227v4, pp. 1-10.

* cited by examiner

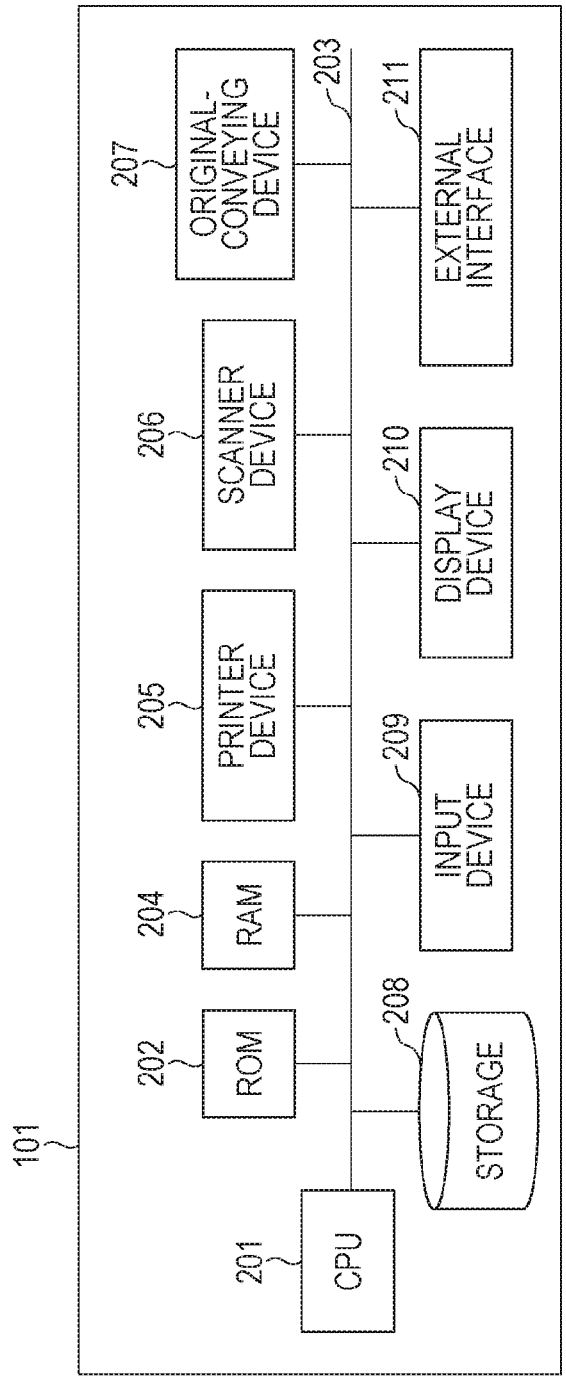

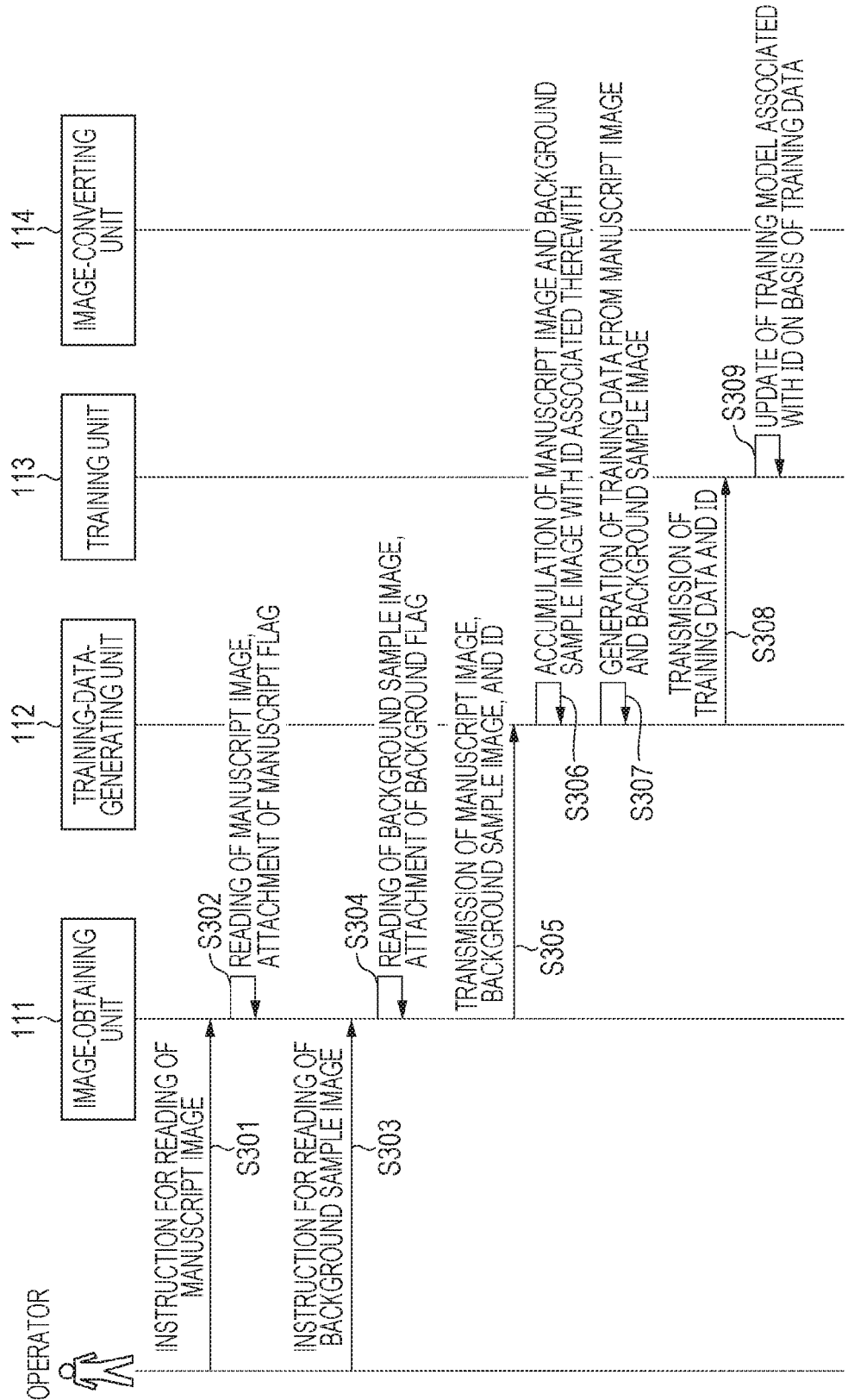

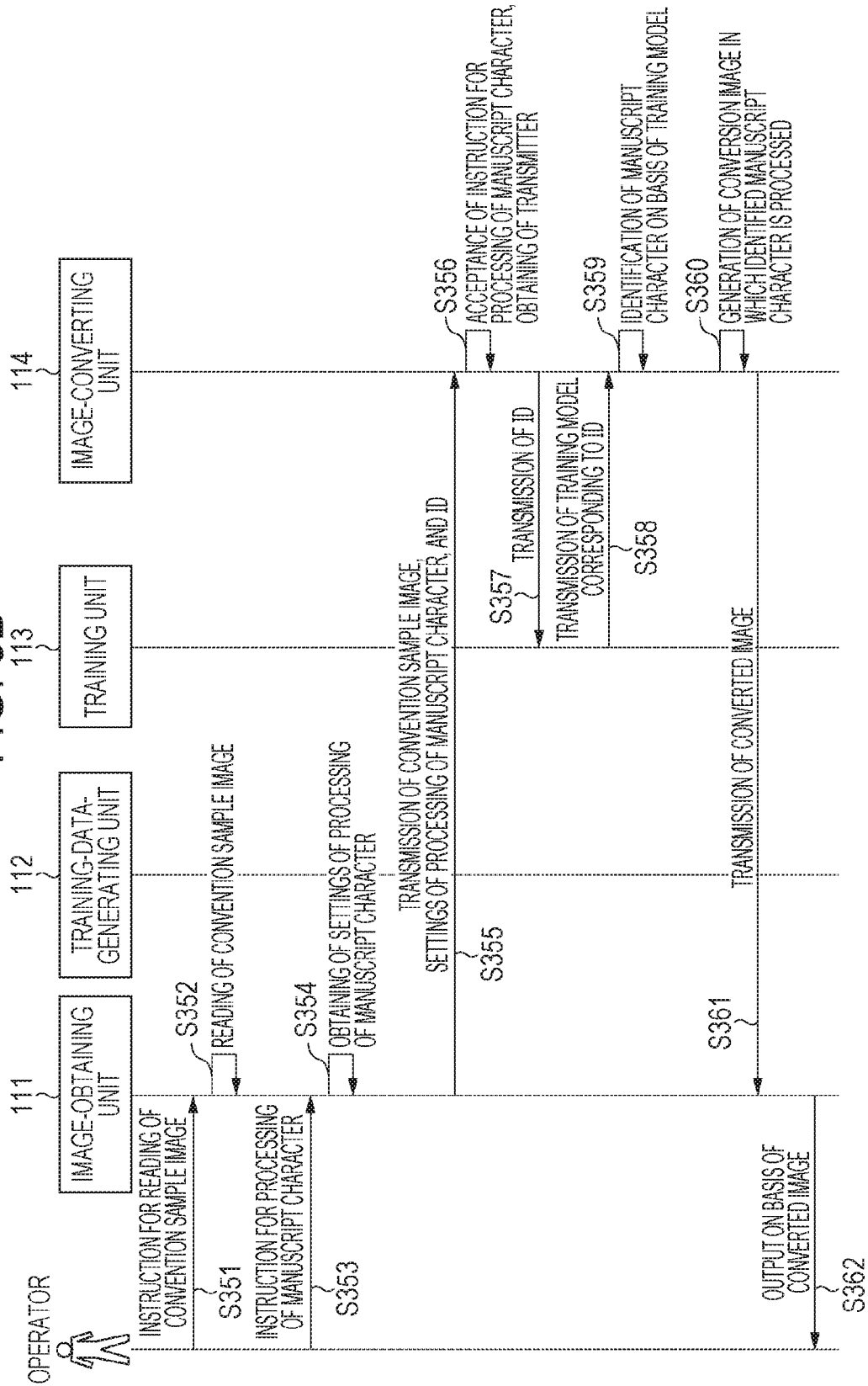

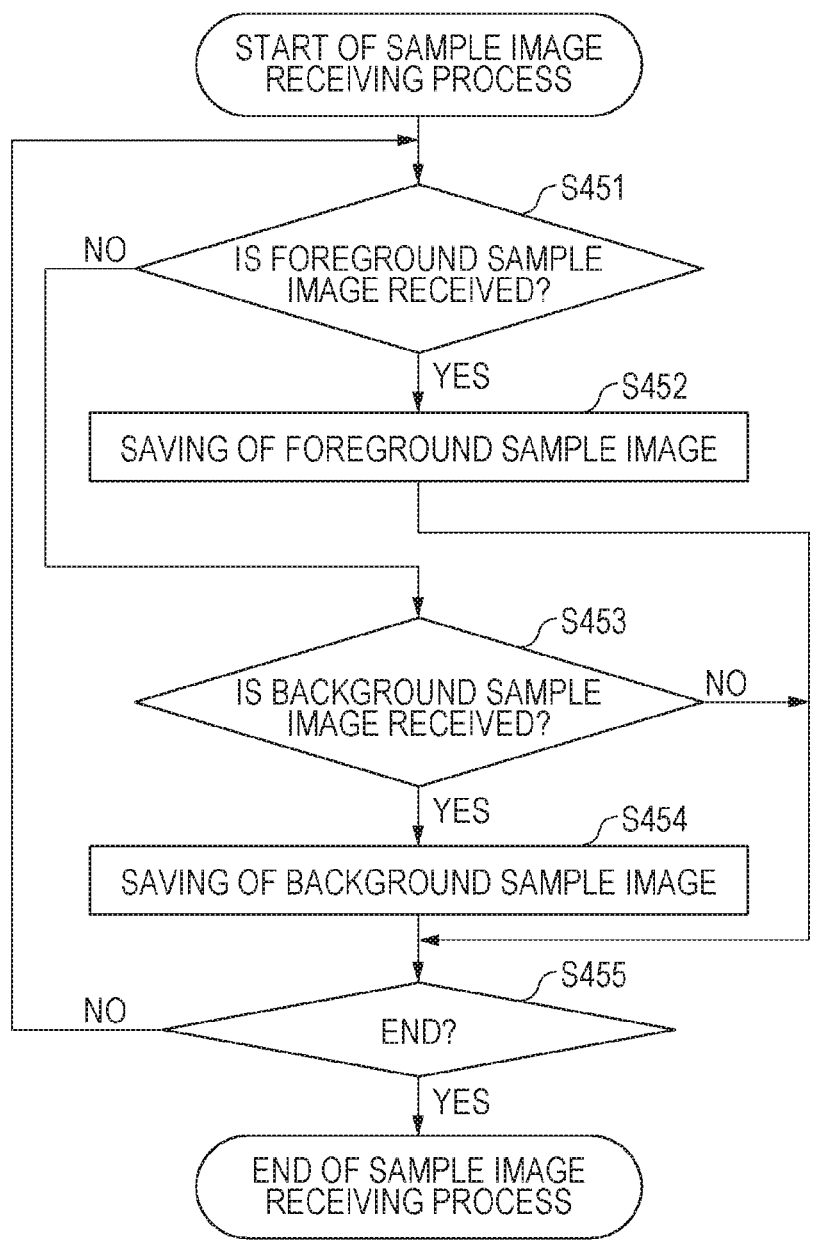

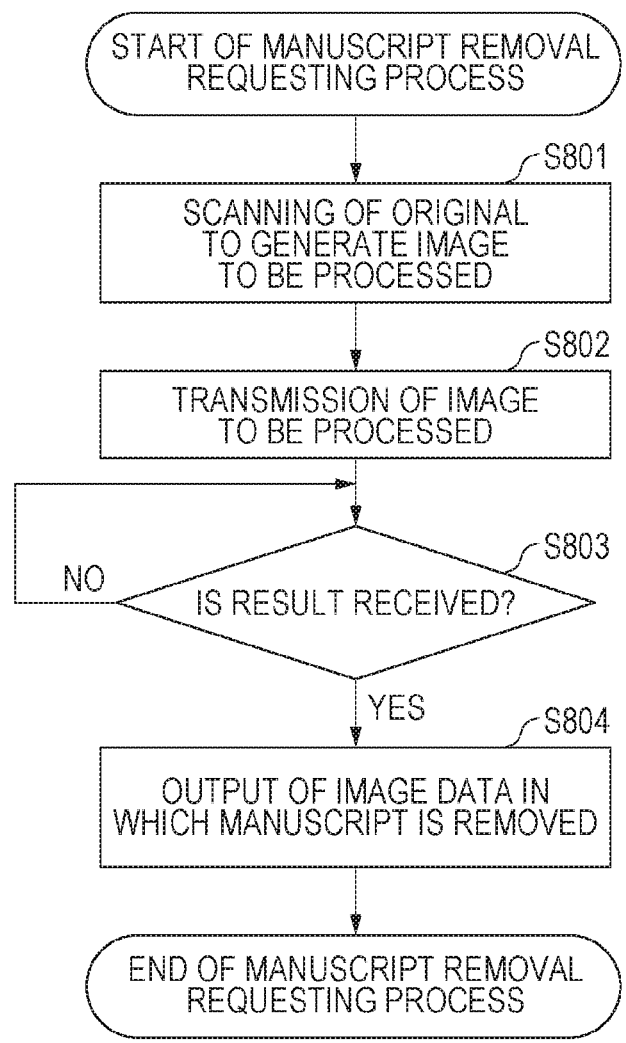

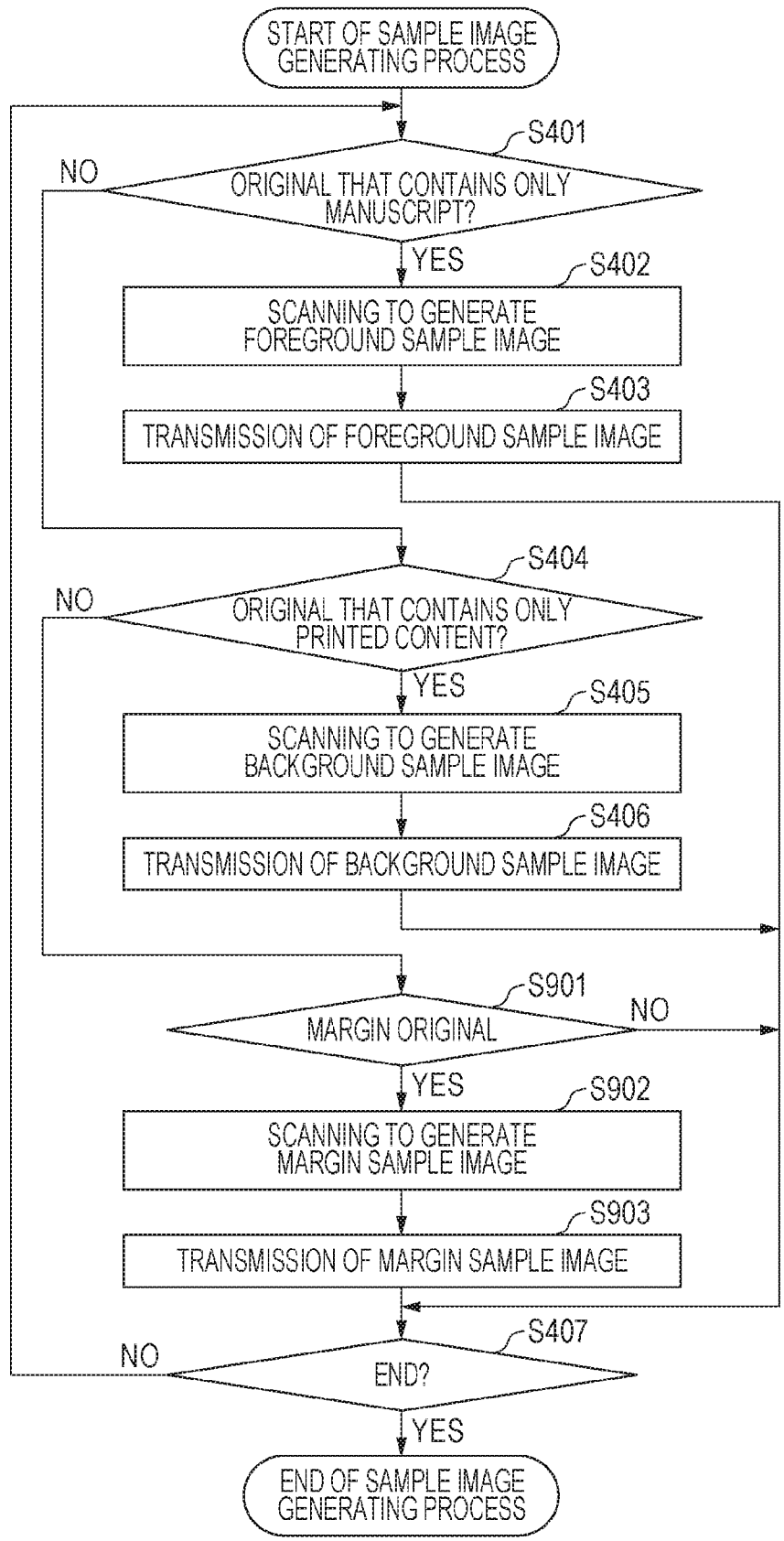

NAME | IKEDA GENKI

IN CASE OF CORPORATION, ○○○.

1205 1202

ADDRESS | OTA-KU SHIMOMARUKO 10 CHOME 2-5-301

PLEASE ENTER NAME OF PREFECTURE FIRST.

1206 1203

PHONE NUMBER | 03-1234-XXXX

PLEASE ENTER DAYTIME PHONE NUMBER.

FIG. 15A

```
<?xml version="1.0" encoding="utf-8" ?>
<result>
    <handwriting x="125" y="202" width="233" height="30" />
    <handwriting x="109" y="550" width="44" height="42" />
</result>
```

FIG. 15B

```
<?xml version="1.0" encoding="utf-8" ?>
<result />
```

FIG. 18

THIS IS CHARACTER COLUMN

THIS IS CHARACTER COLUMN. THIS IS CHARACTER COLUMN. THIS IS CHARACTER COLUMN.
THIS IS CHARACTER COLUMN. THIS IS CHARACTER COLUMN. THIS IS CHARACTER COLUMN.

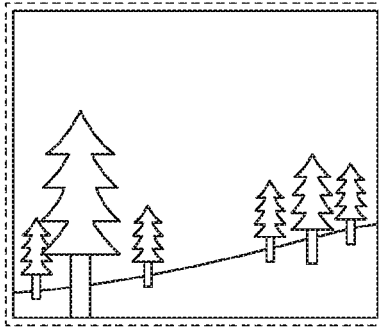

THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.

| HEADER 1 | HEADER 2 | HEADER 3 | HEADER 4 |
|---|---|---|---|
| ITEM 11 | ITEM 12 | ITEM 13 | ITEM 14 |
| ITEM 21 | ITEM 22 | ITEM 23 | ITEM 24 |
| ITEM 31 | ITEM 32 | ITEM 33 | ITEM 34 |

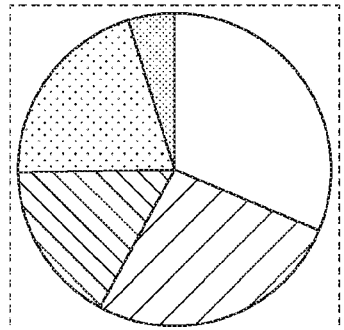

THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.

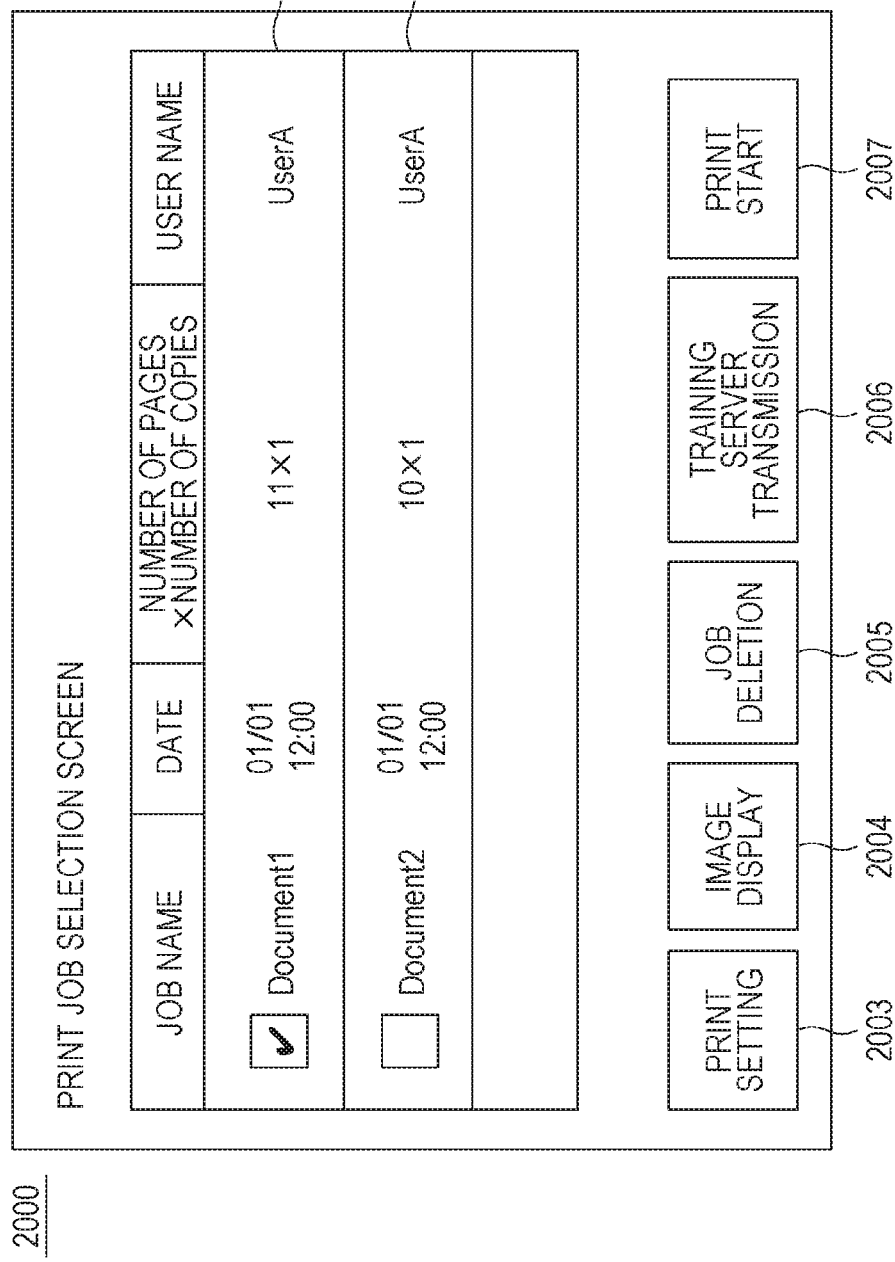

FIG. 22A

THIS IS CHARACTER COLUMN

THIS IS CHARACTER COLUMN. THIS IS CHARACTER COLUMN. THIS IS CHARACTER COLUMN. THIS IS CHARACTER COLUMN. THIS IS CHARACTER COLUMN. THIS IS CHARACTER COLUMN.

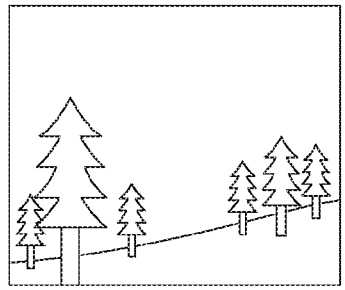

THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.

| HEADER 1 | HEADER 2 | HEADER 3 | HEADER 4 |
|---|---|---|---|
| ITEM 11 | ITEM 12 | ITEM 13 | ITEM 14 |
| ITEM 21 | ITEM 22 | ITEM 23 | ITEM 24 |
| ITEM 31 | ITEM 32 | ITEM 33 | ITEM 34 |

WHY?

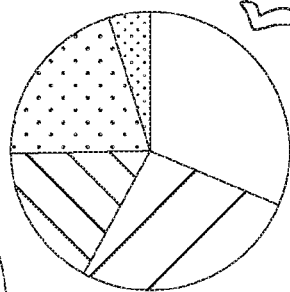

THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.

PROPORTION IS NOT KNOWN

WHY?

PROPORTION IS NOT KNOWN

THIS IS CHARACTER COLUMN

THIS IS CHARACTER COLUMN. THIS IS CHARACTER COLUMN. THIS IS CHARACTER COLUMN. THIS IS CHARACTER COLUMN. THIS IS CHARACTER COLUMN. THIS IS CHARACTER COLUMN.

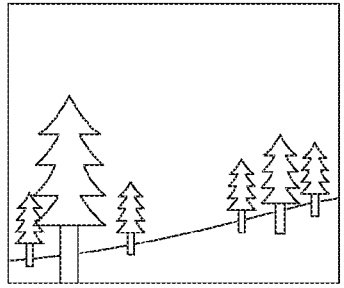

THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.

| HEADER 1 | HEADER 2 | HEADER 3 | HEADER 4 |
|---|---|---|---|
| ITEM 11 | ITEM 12 | ITEM 13 | ITEM 14 |
| ITEM 21 | ITEM 22 | ITEM 23 | ITEM 24 |
| ITEM 31 | ITEM 32 | ITEM 33 | ITEM 34 |

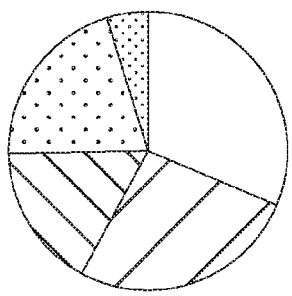

THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.

THIS IS CHARACTER COLUMN

THIS IS CHARACTER COLUMN. THIS IS CHARACTER COLUMN. THIS IS CHARACTER COLUMN.
THIS IS CHARACTER COLUMN. THIS IS CHARACTER COLUMN. THIS IS CHARACTER COLUMN.

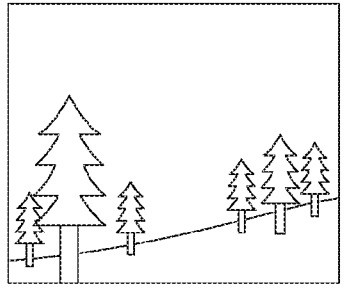

THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.

| HEADER 1 | HEADER 2 | HEADER 3 | HEADER 4 |
|----------|----------|----------|----------|
| ITEM 11  | ITEM 12  | ITEM 13  | ITEM 14  |
| ITEM 21  | ITEM 22  | ITEM 23  | ITEM 24  |
| ITEM 31  | ITEM 32  | ITEM 33  | ITEM 34  |

WHY?

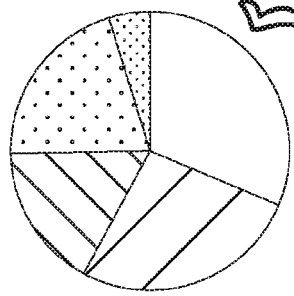

THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.
THIS IS SENTENCE. THIS IS SENTENCE.

PROPORTION IS NOT KNOWN

MAKE EXPRESSION EASY TO UNDERSTAND

2301

P11

METHOD AND SYSTEM FOR TRAINING AND USING A NEURAL NETWORK FOR IMAGE-PROCESSING

BACKGROUND

Field

The present disclosure relates to a method for image processing and an image-processing system.

Description of the Related Art

In recent years, business materials have been increasingly computerized with variations in work environment as computers spread. Objects to be computerized include documents in which manuscript characters are entered, and techniques for extracting a manuscript character are considered. Japanese Patent No. 6140946 discloses a technique for extracting only a manuscript character from a scanned image of a paper medical chart in a manner in which figure information called a schema that is used in a medical document is preregistered. The technique enables a manuscript character that is entered in a margin portion of a printed document and that is valuable as information to be extracted.

However, the technique in Japanese Patent No. 6140946 has a room for improvement regarding an original from which the manuscript character can be extracted. The reason is that the manuscript character cannot be accurately extracted from a kind of original the figure information of which is not registered because the technique in Japanese Patent No. 6140946 uses preregistered figure information to extract the manuscript character. Accordingly, an image-processing system is preferably capable of performing image processing on a manuscript character (a manuscript symbol or a manuscript figure) that is entered in a margin region even in a captured image of an original that contains a figure that is not preregistered.

SUMMARY

The present disclosure provides a method for image processing including training a neural network using composite image data including a background image and a manuscript image and correct image data corresponding to the composite image data, obtaining a captured image of an original that contains a manuscript character, and performing predetermined image processing on the captured image using the neural network.

Further features of the present disclosure will become apparent from the following description of exemplary embodiments with reference to the attached drawings.

BRIEF DESCRIPTION OF THE DRAWINGS

FIG. 2A illustrates the structure of an image-processing apparatus.
FIG. 3A illustrates the sequence of training in the image-processing system.
FIG. 3B illustrates the sequence of use of the image-processing system.
FIG. 4B illustrates the flow of a sample image receiving process.
FIG. 8A illustrates the flow of a manuscript removal requesting process.
FIG. 9A illustrates the flow of a sample image obtaining process according to a second embodiment.
FIG. 12 illustrates an outline of a background sample image generating process.
FIG. 15A illustrates information about a manuscript detection result.
FIG. 15B illustrates the information about the manuscript detection result.
FIG. 18 illustrates examples of a background partial region that is extracted from a background sample image.
FIG. 20A illustrates a print job selection screen.
FIG. 22A to FIG. 22D illustrate an outline of a manuscript image converting process.
FIG. 23A illustrates an example of a document that contains a manuscript character.

DESCRIPTION OF THE EMBODIMENTS

Aspects for carrying out the present disclosure will hereinafter be described with reference to the drawings with embodiments having specific structures. Features for accomplishing the present disclosure are not limited to the features described according to the embodiments. Parts of the features described according to the embodiments may be omitted or replaced with equivalents within a range in which the same effects are achieved.

First Embodiment

Image-Processing System

Figure 1:
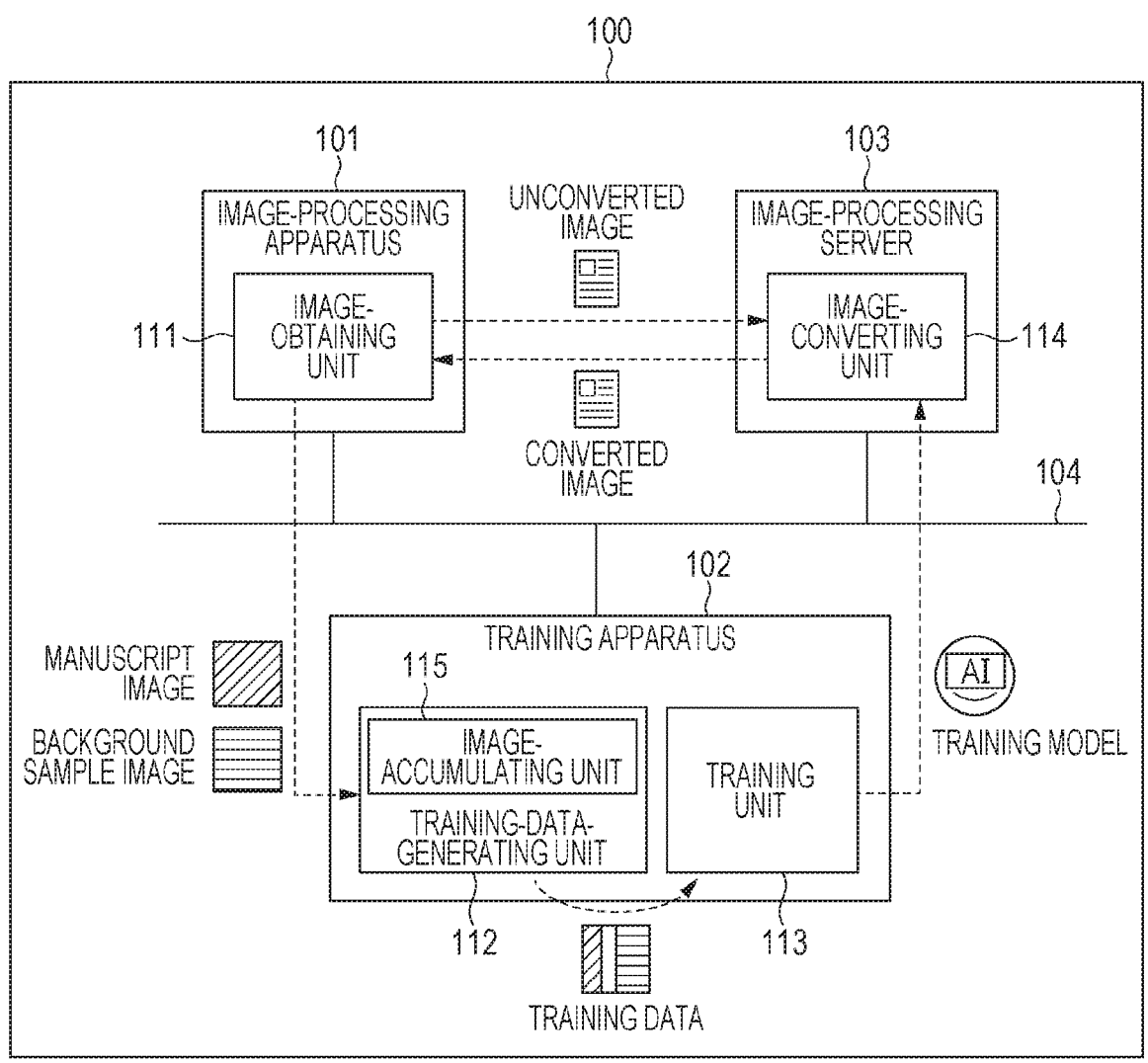
FIG. 1 illustrates the structure of an image-processing system.

FIG. 1 illustrates the structure of an image-processing system. An image-processing system 100 includes an image-processing apparatus 101, a training apparatus 102, and an image-processing server 103. The image-processing apparatus 101, the training apparatus 102, and the image-processing server 103 are connected by using a network 104.

An example of the image-processing apparatus 101 is a digital multifunction apparatus referred to as, for example, a MFP and has a print function and a scan function (functions as an image-obtaining unit 111). The image-processing apparatus 101 scans an original that is obtained by entering only a manuscript in a blank sheet by the scan function to generate image data (the image is referred to below as a "foreground sample image"). Originals are scanned to obtain foreground sample images. The image-processing apparatus 101 prints a digital document to output a printed original. The printed original is scanned to generate image data (the image is referred to below as a "background sample image"). Printed originals are scanned to obtain background sample images. The image-processing apparatus 101 transmits the foreground sample images and the background sample images to the training apparatus 102 via the network 104. When the manuscript is extracted, the image-processing apparatus 101 scans an original that contains a manuscript character (a manuscript symbol or a manuscript figure) to obtain scan image data (unconverted image) to be processed (the scan image data is referred to below as an "image to be processed"). The image to be processed is transmitted to the image-processing server 103 via the network 104.

The training apparatus 102 functions as an image-accumulating unit 115 that accumulates the foreground sample images and the background sample images that are generated by the image-processing apparatus 101. The training apparatus 102 also functions as a training-data-generating unit 112 that generates training data from the images that are thus accumulated. The training-data-generating unit generates data that is used to train a neural network for manuscript extraction. The training apparatus 102 functions as a training unit 113 that uses the generated training data to train the neural network. As a result of training by the training unit 113, a training result (for example, parameters of the neural network) is generated. The training apparatus 102 transmits the training result (a training model) to the image-processing server 103 via the network 104. One of machine training methods with the neural network is deep training with a multilayer neural network.

The image-processing server 103 performs manuscript extraction on the image to be processed that is generated by the image-processing apparatus 101. At this time, the image-processing apparatus 101 extracts (specifies) a manuscript pixel (pixel position) in the image to be processed by inference of the neural network with the training result that is generated by the training apparatus 102. The image-processing server 103 functions as an image-converting unit 114 that performs various kinds of image processing on the extracted manuscript pixel. According to present embodiment, the extracted manuscript pixel is converted into a white pixel to remove the manuscript. The image-processing server 103 transmits the processed image (converted image) in which the manuscript is removed to the image-processing apparatus 101. The image-processing apparatus 101 outputs the processed image that is received, in which the manuscript is removed, by printing the image or transmitting the image to a destination desirable for a user.

Sequence of Training

The sequence of training in the system will be described. FIG. 3A illustrates the sequence of training in the image-processing system.

At a step 301 (referred to below as, for example, S301), in response to an operator instruction for reading of a manuscript image, the image-obtaining unit 111 reads the manuscript image and attaches a manuscript flag to the image (S302). At S303, in response to an operator instruction for reading of a background image, the image-obtaining unit 111 reads the background image and attaches a background flag to the image (S303).

The manuscript image and the background image that are thus read are transmitted to the training-data-generating unit 112. At this time, ID information is preferably attached to the manuscript image and the background image. An example of the ID information is information for recognizing the image-processing apparatus 101 that functions as the image-obtaining unit 111. The ID information may be user recognition information for recognizing the user who operates the image-processing apparatus 101 or group recognition information for recognizing a group to which the user belongs.

The training-data-generating unit 112 accumulates the transmitted image in the image-accumulating unit 115 (S306). The training-data-generating unit 112 generates the training data on the basis of the accumulated data (S307). At this time, the training data may be generated by using only the image based on specific ID information. Subsequently, the training-data-generating unit 112 transmits the training data to the training unit 113 (S308). In the case where the training data is generated by using only the image based on the specific ID information, the ID information is also transmitted. The training unit 113 updates the training model on the basis of the received training data (S309). The training unit 113 may hold the training model for every ID information and may use only corresponding training data for training. A training model that specializes in specific environment can be produced by associating the ID information and the training model with each other.

Sequence of Use

The sequence of use of the system will be described. FIG. 3B illustrates the sequence of use of the image-processing system. FIG. 22A to FIG. 22D illustrate an outline of a manuscript image converting process.

At S351, in response to an operator instruction for reading of the image to be processed, the image-obtaining unit 111 reads the image to be processed and attaches a flag of an object to be processed to the image (S352). An example of the image that is read is an image 2201. The image 2201 contains manuscript characters 2205.

At S353, in response to an operator instruction for processing of the manuscript character (instruction for conversion), the image-obtaining unit 111 obtains information about settings of processing of the manuscript character (S354).

The image to be processed that is thus read is transmitted to the image-converting unit 114 together with the information about settings of processing (S355). At this time, the ID information is preferably attached to data to be transmitted.

The image-converting unit 114 receives the data and accepts the instruction for processing of the manuscript character (S356). At this time, the image-converting unit 114 learns that the image-obtaining unit 111 is a destination to which data is replied. The image-converting unit 114 that accepts the instruction for processing of the manuscript character requests a newest training model from the training unit 113 (S357). In response to this, the training unit 113 transmits the newest training model to the image-converting unit. In the case where the ID information is designated in the request from the image-converting unit 114, the training model corresponding to the ID information is transmitted (S358). The image-converting unit 114 performs a process (identification process) of extracting the manuscript character from the unconverted image on the basis of the obtained training model (S359). In the extracting process, an image 2202, for example, is obtained. An image is generated by processing the manuscript character on the basis of an extraction result. The image-converting unit 114 transmits the generated converted image to the image-obtaining unit 111 (S361). The image-obtaining unit that obtains the converted image performs an output process based on the data. Examples of the output process include print based on the converted image and display of a screen based on the converted image.

Structure of Apparatus

Figure 2B:
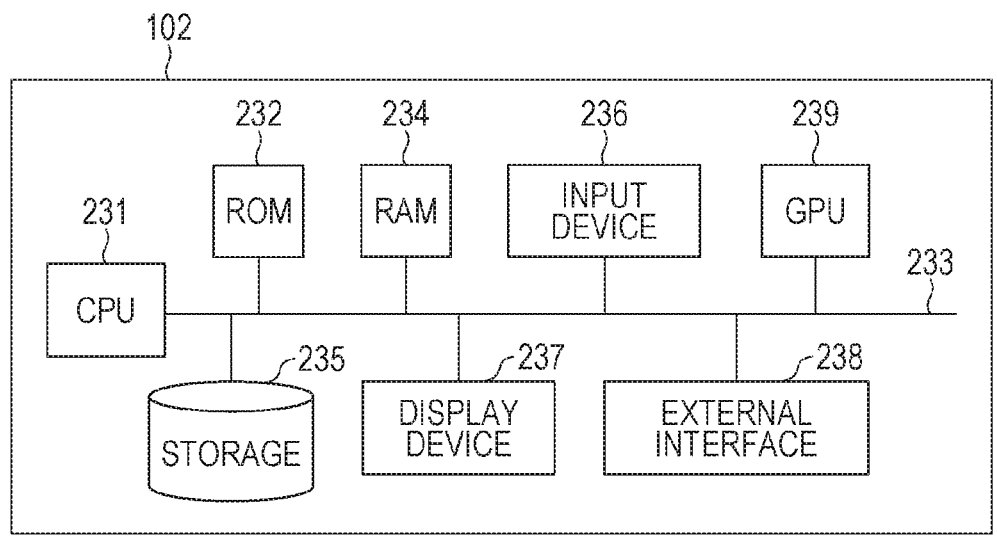
FIG. 2B illustrates the structure of a training apparatus.
Figure 2C:
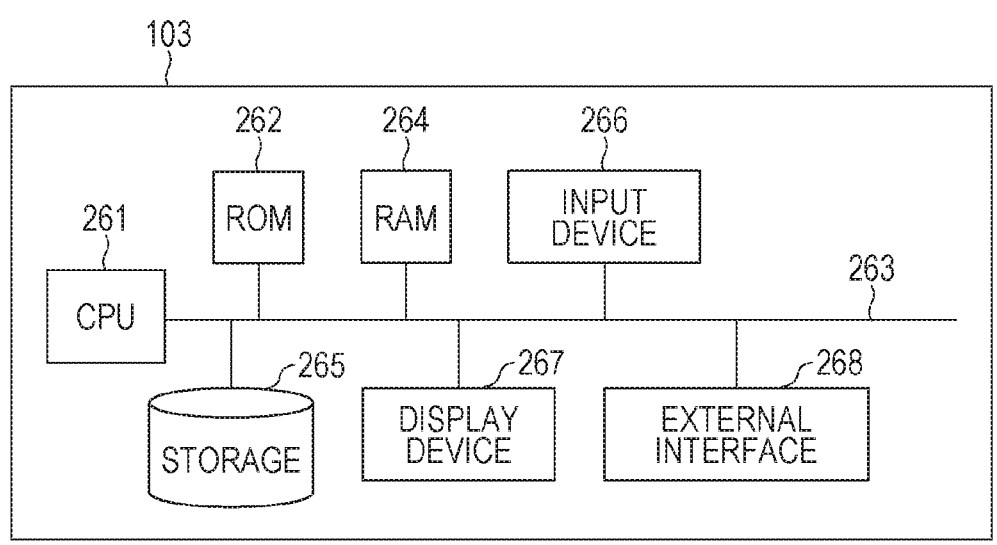
FIG. 2C illustrates the structure of an image-processing server.

To achieve the above system, each apparatus has the following structure. FIG. 2A illustrates the structure of the image-processing apparatus. FIG. 2B illustrates the structure of the training apparatus. FIG. 2C illustrates the structure of the image-processing server. As illustrated in FIG. 2A, the image-processing apparatus 101 includes the following: a CPU 201, a ROM 202, a RAM 204, a printer device 205, a scanner device 206, an original-conveying device 207, a storage 208, an input device 209, a display device 210, and an external interface 211. The devices are connected so as to be able to communicate each other by using a data bus 203.

The CPU 201 is a controller for controlling the image-processing apparatus 101 collectively. The CPU 201 starts up an OS (operating system) by using a boot program that is stored in the ROM 202. The OS runs a control program that is stored in the storage 208. The control program is used to control the image-processing apparatus 101. The CPU 201 controls each device that is connected by the data bus 203 collectively. The RAM 204 operates as a temporary storage area such as a main memory or a work area of the CPU 201.

The printer device 205 prints image data on paper (a recording material or a sheet). For this, there are an electrophotographic printing method with a photosensitive drum or a photosensitive belt, or an ink-jet method in which ink is discharged from a fine nozzle array and an image is directly printed on paper. However, each method can be acceptable. The scanner device 206 scans an original such as paper by using an optical reading apparatus such as a CCD, converts obtained electric single data, and generates scan image data. The original-conveying device 207 such as an ADF (auto document feeder) conveys originals that are placed on an original stand on the original-conveying device 207 one by one to the scanner device 206.

The storage 208 is a nonvolatile memory that enables writing and reading such as a HDD or a SSD. Various kinds of data such as the above control program are recorded therein. The input device 209 includes a touch panel or hardware keys. The input device 209 accepts an operation instruction from the user. Information about the instruction including an instruction position is transmitted to the CPU 201. Examples of the display device 210 include a LCD and a CRT. The display device 210 displays display data that is generated by the CPU 201. The CPU 201 determines what operation is made from the information about the instruction that is received from the input device 209 and the display data that is displayed on the display device 210. In accordance with a determination result, the image-processing apparatus 101 is controlled, and new display data is generated and displayed on the display device 210.

The external interface 211 transmits and receives various kinds of data such as the image data to and from an external device via a network such as a LAN or a telephone line, or by proximate wireless such as infrared. The external interface 211 receives PDL data from an external device such as the training apparatus 102 or a PC (not illustrated). The CPU 201 interprets the PDL data that is received by the external interface 211 and generates an image. The generated image is printed by the printer device 205 or stored in the storage 108. The external interface 211 receives the image data from an external device such as the image-processing server 103. The received image data is printed by the printer device 205, stored in the storage 108, or transmitted to another external device by the external interface 211.

The training apparatus 102 in FIG. 2B includes a CPU 231, a ROM 232, a RAM 234, a storage 235, an input device 236, a display device 237, an external interface 238, and a GPU 239. These components can transmit and receive data to and from each other via a data bus 233.

The CPU 231 is a controller for controlling the entire training apparatus 102. The CPU 231 starts up an OS by using a boot program that is stored in the ROM 232, which is a nonvolatile memory. The OS runs a training data generating program and a training program that are stored in the storage 235. The CPU 231 performs the training data generating program to generate the training data. The CPU 231 performs the training program to train the neural network for manuscript extraction. The CPU 231 controls the components by using a bus such as the data bus 233.

The RAM 234 operates as a temporary storage area such as a main memory or a work area of the CPU 231. The storage 235 is a nonvolatile memory that enables writing and reading and records the above training data generating program and training program.

The input device 236 includes a mouse or a keyboard. The display device 237 is the same as the display device 210 described with reference to FIG. 2A.

The external interface 238 is the same as the external interface 211 described with reference to FIG. 2A.

The GPU 239, which is a processor for image processing, generates the image data and trains the neural network in corporation with the CPU 231.

The image-processing server 103 in FIG. 2C includes a CPU 261, a ROM 262, a RAM 264, a storage 265, an input device 266, a display device 267, and an external interface 268. These components can transmit and receive data to and from each other via a data bus 263.

The CPU 261 is a controller for controlling the entire image-processing server 103. The CPU 261 starts up an OS by using a boot program that is stored in the ROM 262, which is a nonvolatile memory. The OS runs an image processing server program that is stored in the storage 265. The CPU 261 performs the image processing server program to extract and remove the manuscript pixel from the image to be processed. The CPU 261 controls the components by using a bus such as the data bus 263.

The RAM 264 operates as a temporary storage area such as a main memory or a work area of the CPU 261. The storage 265 is a nonvolatile memory that enables writing and reading and records the above program of the image-processing server.

The input device 266 is the same as the input device 236 described with reference to FIG. 2B. The display device 267 is the same as the display device 210 described with reference to FIG. 2A.

The external interface 268 is the same as the external interface 211 described with reference to FIG. 2A.

Operation Screen

Figure 20B:
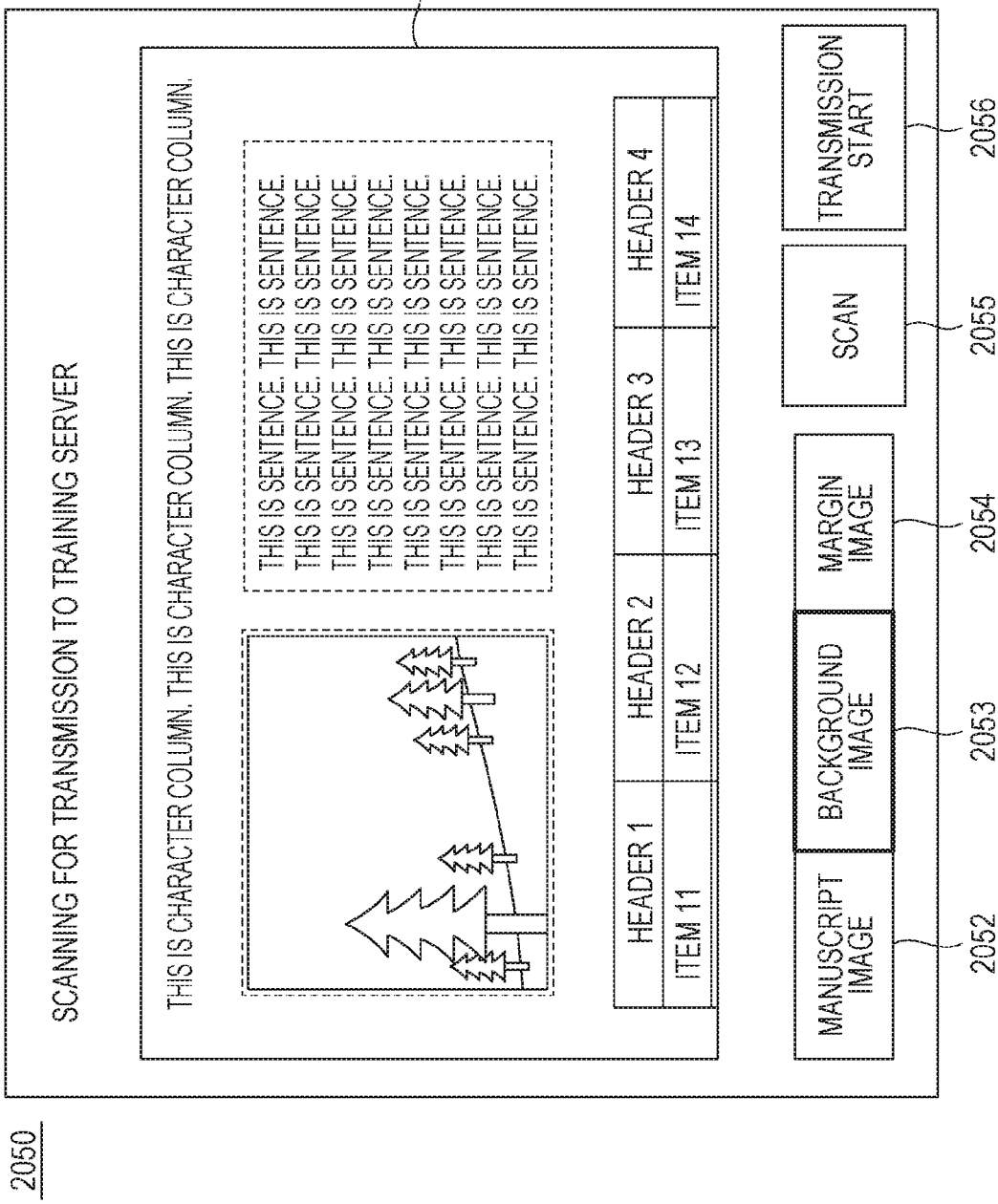
FIG. 20B illustrates a training original scan screen.

The instructions of the operator at S301 and S303 are inputted in the following operation screens. FIG. 20A illustrates a print job selection screen. FIG. 20B illustrates a training original scan screen.

A training original scan screen 2050 is an example of a screen that is displayed on the display device 210. As illustrated in FIG. 20B, the training original scan screen 2050 includes a preview region 2051, image attribution designating buttons 2052, 2053, and 2054, a scan button 2055, and a transmission start button 2056.

The scan button 2055 is used to start reading of the original that is set on the scanner device 206. When scanning is completed, a preview of a captured image is displayed in the preview region 2051. Pieces of image data can be collectively held by setting another original on the scanner device 206 and pushing the scan button 2055 again.

The image attribution designating buttons 2052, 2053, and 2054 are used to designate the attribution of the captured image. The selection of the image attribution designating button 2052 gives a manuscript image attribution to the captured image. The selection of the image attribution designating button 2053 gives a background image attribution to the captured image. The selection of the image attribution designating button 2054 gives a margin image attribution to the captured image. The selected button is displayed so as to be recognizably emphasized.

After the image is read and the kind of the image is selected, the transmission start button 2056 can be selected.

The selection of the transmission start button 2056 starts transmitting, to the training apparatus 102, the captured image to which the selected image attribution is given.

A print job selection screen 2000 is an example of the screen that is displayed on the display device 210. As illustrated in FIG. 20A, the print job selection screen 2000 includes job information 2001 and 2002, a print setting button 2003, an image display button 2004, a job deletion button 2005, a training server transmission button 2006, and a print start button 2007. The job information 2001 and 2002 is used to identify a print job that is held by the image-processing apparatus 101. A print process with the printer device 205 can be started by selecting the job information of the print job to be printed and subsequently selecting the print start button 2007 on the print job selection screen 2000. When the job is selected and the print setting button 2003 is selected on the print job selection screen 2000, a print setting screen (not illustrated) for changing print settings is displayed. When the job is selected and the image display button 2004 is selected on the print job selection screen 2000, a preview screen (not illustrated) for displaying a preview image of the print job is displayed. When the job is selected and the job deletion button 2005 is selected on the print job selection screen 2000, the selected job is deleted. When the job is selected and the training server transmission button 2006 is selected on the print job selection screen 2000, the training original scan screen 2050 is displayed. The job that is selected on the print job selection screen 2000 is held as in the scanned image and displayed in the preview region 2051. When the operator subsequently selects the image attribution designating buttons 2052, 2053, and 2054, and the transmission start button 2056, the print job can be transmitted as a sample image to the training apparatus.

Figure 21:
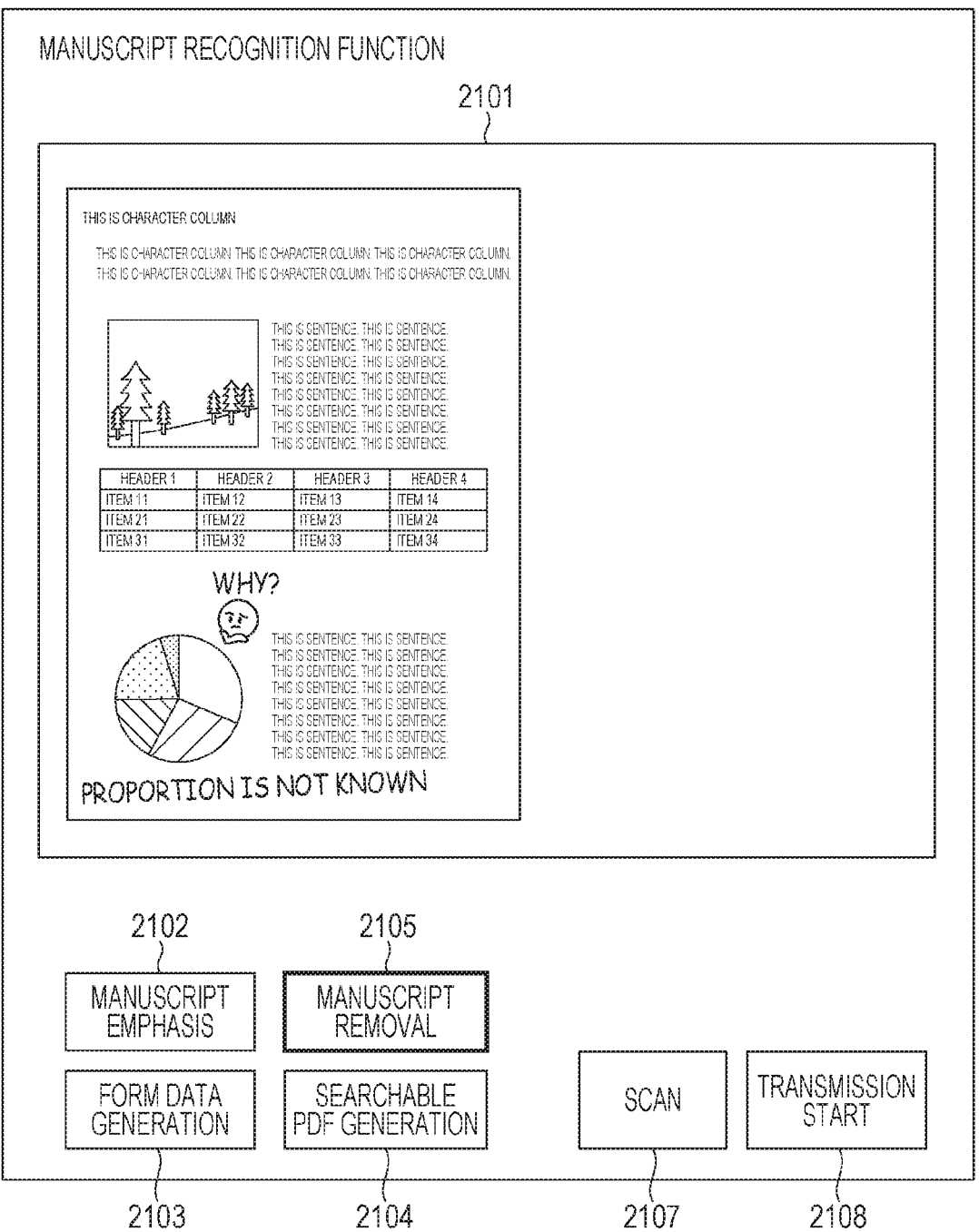
FIG. 21 illustrates an operation screen on which a manuscript recognition function is operated.
Figure 22B:

The instructions of the operator at S351 and S353 are inputted on the following operation screens. FIG. 21 illustrates an operation screen on which a manuscript recognition function is operated. On an operation screen 2100 on which the manuscript recognition function is operated, various operations related to the manuscript recognition function are possible. As illustrated in FIG. 21, the operation screen 2100 includes a preview region 2101, process designating buttons 2102, 2103, 2104, and 2105, a scan button 2107, and a transmission start button 2108.

The scan button 2107 is used to start reading of the original that is set on the scanner device 206. When scanning is completed, a preview of a captured image is displayed in the preview region 2051. Pieces of image data can be collectively held by setting another original on the scanner device 206 and pushing the scan button 2107 again. The process designating buttons 2102, 2103, 2104, and 2105 are used to designate a process to be performed on the basis of the captured image (request information is given). The selection of the process designating button 2102 gives a manuscript emphasis setting to the captured image. The selection of the process designating button 2105 gives a manuscript removal setting to the captured image. The selection of the process designating button 2103 gives a form data setting to the captured image. The selection of the process designating button 2104 gives a searchable PDF setting to the captured image. The selected button is displayed so as to be recognizably emphasized.

Sample Image Generating Process

Figure 4A:
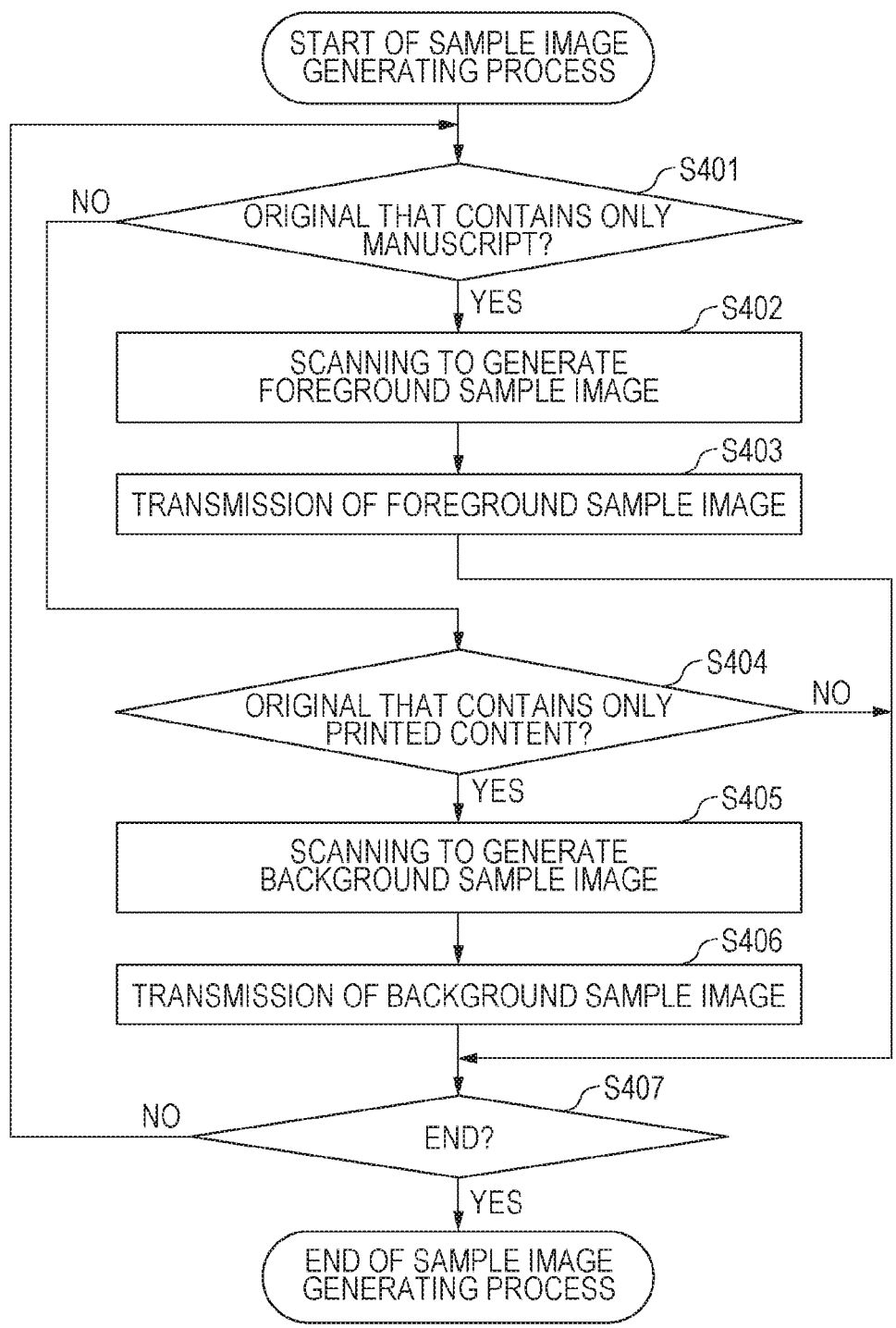
FIG. 4A illustrates the flow of a sample image generating process.

FIG. 4A illustrates the flow of a sample image generating process.

The sample image generating process of the image-processing apparatus 101 will now be described. FIG. 4A is the flowchart of the sample image generating process. The process is performed in a manner in which the CPU 201 reads a control program that is recorded in the storage 208 and loads the control program onto the RAM 204. This is started when the user operates the input device 209 of the image-processing apparatus 101.

At S401, the CPU 201 determines whether scanning of the original that contains only the manuscript is instructed. If the user carries out predetermined operation for scanning the original that contains only the manuscript by using the input device 209, the result of determination is YES, and the flow proceeds to S402. If not, the result of determination is NO, and the flow proceeds to S404.

At S402, the CPU 201 controls the scanner device 206 and the original-conveying device 207 for scanning of the original to generate the foreground sample image. The original is obtained in a manner in which a person enters a manuscript sentence or figure (for example, a line or an arrow) in a blank sheet, and only the manuscript is contained therein. The foreground sample image is generated as full color (three channels: RGB) image data.

At S403, the CPU 201 transmits the foreground sample image that is generated at S402 to the training apparatus 102 via the external interface 211. At this time, the foreground sample image is transmitted with attached information representing that the image data that is transmitted is data of the foreground sample image.

At S404, the CPU 201 determines whether scanning of the original that contains only a printed content is instructed. If the user carries out predetermined operation for scanning of the original that contains only the printed content by using the input device 209, the result of determination is YES, and the flow proceeds to S405. If not, the result of determination is NO, and the flow proceeds to S407.

At S405, the CPU 201 controls the scanner device 206 and the original-conveying device 207 for scanning of the original to generate the background sample image. The original is obtained by printing, for example, a digital document on paper, and only the printed content is contained therein. The background sample image is generated as full color (three channels: RGB) image data.

At S406, the CPU 201 transmits the background sample image that is generated at S405 to the training apparatus 102 via the external interface 211. At this time, the background sample image is transmitted with attached information representing that the image data that is transmitted is data of the background sample image.

At S407, the CPU 201 determines whether the process is ended. If the user carries out predetermined operation for ending of the sample image generating process, the result of determination is YES, and the process is ended. If not, the result of determination is NO, and the flow proceeds to S401.

Through the above processes, the image-processing apparatus 101 generates the foreground sample image and the background sample image and transmits the images to the training apparatus 102. The foreground sample images and the background sample images are obtained depending on the operation of the user and the number of the originals that are placed on the original-conveying device 207.

Sample Image Receiving Process

A sample image receiving process of the training apparatus 102 will now be described. FIG. 4B illustrates the flow of the sample image receiving process. The process is performed in a manner in which the CPU 231 reads the training data generating program that is recorded in the storage 235 and loads the training data generating program onto the RAM 234. This is started when the user powers ON the training apparatus 102.

At S451, the CPU 231 determines whether the foreground sample image is received. If the image data is received via the external interface 238, and the information representing that the image data is data of the foreground sample image is attached, the CPU 231 determines that the result is YES, and the flow proceeds to S452. If not, the result of determination is NO, and the flow proceeds to S453.

At S452, the CPU 231 causes the storage 235 to record the received foreground sample image in a predetermined region.

At S453, the CPU 231 determines whether the background sample image is received. If the image data is received via the external interface 238, and the information representing that the image data is data of the background sample image is attached, the CPU 231 determines that the result is YES, and the flow proceeds to S454. If not, the result of determination is NO, and the flow proceeds to S455.

At S454, the CPU 231 causes the storage 235 to record the received background sample image in a predetermined region.

At S455, the CPU 231 determines whether the process is ended. If the user carries out predetermined operation for ending of the sample image receiving process, for example, the training apparatus 102 is powered OFF, the result of determination is YES, and the process is ended. If not, the result of determination is NO, and the flow proceeds to S451.

Training Data Generating Process

Figure 5:
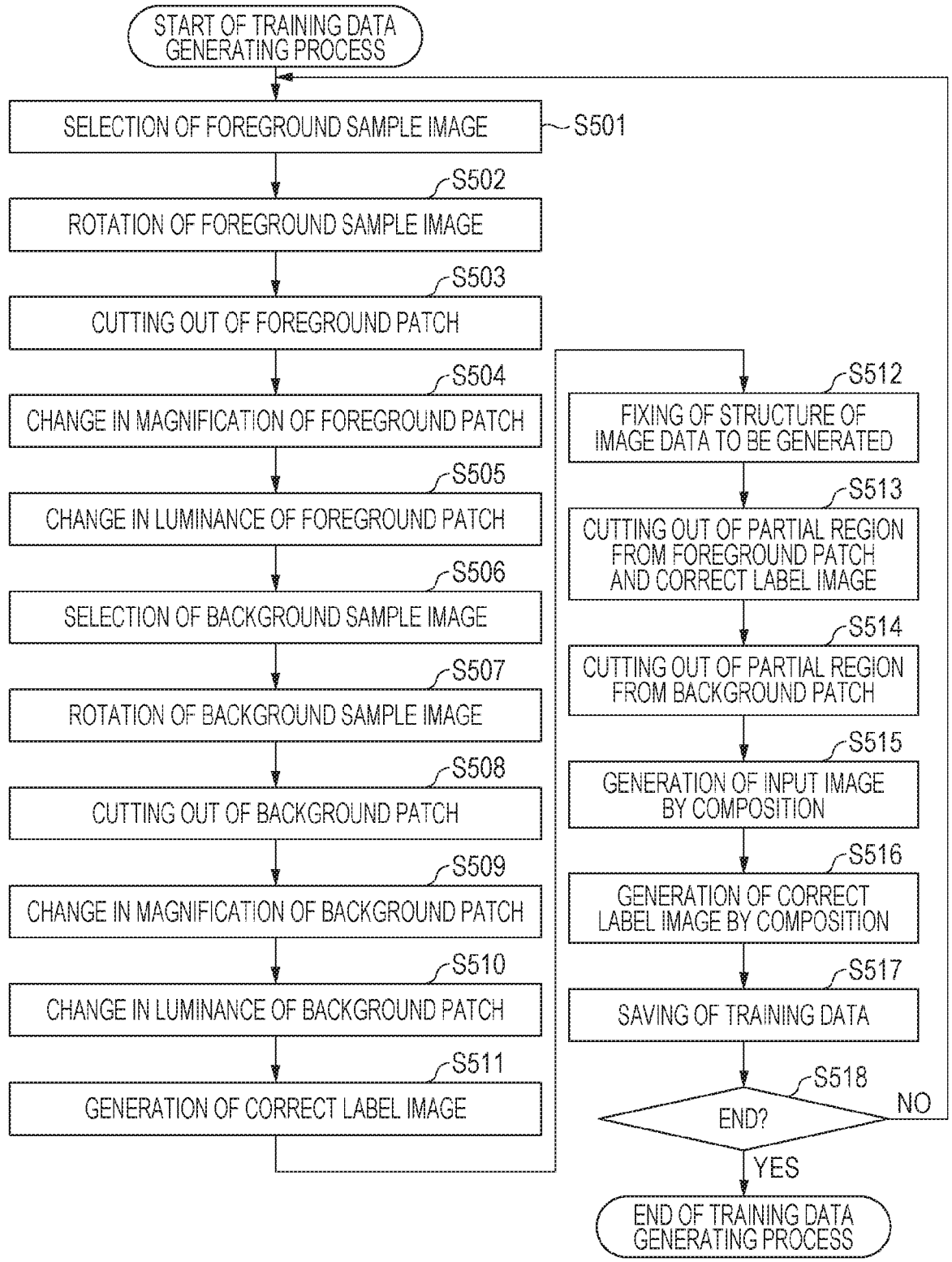
FIG. 5 illustrates the flow of a training data generating process.

A training data generating process of the training apparatus 102 will now be described. FIG. 5 illustrates the flow of the training data generating process. FIG. 6A to FIG. 6H illustrate examples of the structure of an input image that is generated by image composition.

The process is performed by the training-data-generating unit 112 of the training apparatus 102. This is started when the user carries out predetermined operation by using the input device 209 of the image-processing apparatus 101.

At S501, the CPU 231 selects and reads one of the foreground sample images that are stored in the storage 235. In a processing step at S452 in the flowchart in FIG. 4B, the foreground sample images are recorded in the storage 235. Accordingly, one of the foreground sample images is randomly selected therefrom.

At S502, the CPU 231 processes the foreground sample image that is read at S501 by rotating the foreground sample image. A rotation angle is randomly selected from a predetermined range (for example, from −10 degrees to 10 degrees) and fixed.

At S503, the CPU 231 generates image data by cutting out a part (for example, a size of length×width=512×512) of the foreground sample image (the image data is referred to below as a "foreground patch"). The position at which the part is cut out is randomly fixed.

At S504, the CPU 231 processes the foreground patch that is generated at S503 by changing magnification. The ratio of the change in the magnification is randomly selected from a predetermined range (for example, from 50% to 150%) and fixed. In addition, the foreground patch is updated by cutting out a central part (for example, a size of length×width=256×256) of the foreground patch after the change in the magnification.

At S505, the CPU 231 processes the foreground patch by changing the luminance of each pixel. The CPU 231 creates a grayscale foreground patch from the foreground patch and changes the luminance of the foreground patch by using gamma correction. A gamma value is randomly selected from a predetermined range (for example, from 0.1 to 10.0) and fixed.

At S506, the CPU 231 selects and reads one of the background sample images that are stored in the storage 235. In a processing step at S454 in the flowchart in FIG. 4B, the background sample images are recorded in the storage 235. Accordingly, one of the background sample images is randomly selected therefrom.

At S507, the CPU 231 processes the background sample image that is read at S506 by rotating the background sample image. The rotation angle is randomly selected from a predetermined range (for example, from −10 degrees to 10 degrees) and fixed.

At S508, the CPU 231 generates image data by cutting out a part (the same size as when the foreground patch is cut out at S503) of the background sample image (the image data is referred to below as a "background patch"). The position at which the part is cut out is randomly fixed.

At S509, the CPU 231 processes the background patch that is generated at S508 by changing the magnification. The ratio of the change in the magnification is randomly selected from a predetermined range (for example, from 50% to 150%) and fixed. In addition, the background patch is updated by cutting out a central part (the same size as when the foreground patch is cut out at S504) of the background patch after the change in the magnification.

At S510, the CPU 231 processes the background patch by changing the luminance of each pixel. The CPU 231 creates a grayscale background patch from the background patch and changes the luminance of the background patch by using the gamma correction. The gamma value is randomly selected from a predetermined range (for example, from 0.1 to 10.0) and fixed.

Through the above processing steps, the foreground patch and the background patch are obtained. The reason why the foreground patch and the background patch are processed by rotation, the change in the magnification, and the change in the luminance is that the diversity of the training data improves generalized performance of the neural network that is trained by using the training data. The foreground sample image and the background sample image are generated, for example, by scanning A4 paper with a resolution of 300 dpi. In this case, the number of the pixels is 2480×3508, which is large. This leads to reduction in processing efficiency on loading onto the RAM 234 and reading by the CPU 231 and GPU 239 in a training process described later. Accordingly, a partial image having a decreased size is cut out for use as described above. The partial image is cut out at a randomly fixed position, and various kinds of the training data can be generated from the foreground sample image.

At S511, the CPU 231 generates a correct label image (teacher data or correct image data) for the foreground patch. The CPU 231 performs a binarization process on the foreground patch. A pixel value that is lower than a predetermined threshold is defined as a manuscript value (for example, 255. The same is true for the following description). Another pixel value is defined as a non-manuscript value (for example, 0. The same is true for the following description). The image data the pixel value of which is thus defined is generated as the correct label image for the foreground patch.

At S512, the CPU 231 fixes the structure of the image data to be generated by the image composition. The image data includes a foreground image region, a background image region, and a margin image region (referred to below as a "foreground region", a "background region", and a "margin region"). In this processing step, the positions and areas of these regions are fixed. The direction of a foreground with respect to a background is first fixed. The direction is randomly selected from eight directions of an upward direction, an upper right direction, a right direction, a lower right direction, a downward direction, a lower left direction, a left direction, and an upper left direction and fixed. The width of a margin between the foreground and the background is subsequently fixed. The width is randomly selected from a predetermined range (for example, from one pixel to 50 pixels) and fixed. The foreground region is fixed. This will be described with reference to FIG. 6A to FIG. 6H. The size of the image data that is generated by the image composition is equal to the size of the foreground patch (and the background patch). In each figure, the foreground region is illustrated by diagonal lines, the background region is illustrated by horizontal lines, and the margin region is illustrated by a white background.

Figure 6A:
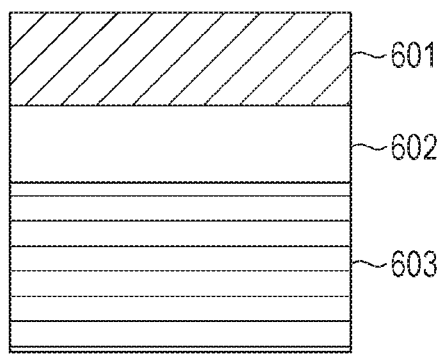
FIG. 6A to FIG. 6H illustrate examples of the structure of an input image that is generated by image composition.

When the direction of the foreground with respect to the background is the upward direction, as illustrated in a region 601 in FIG. 6A, the foreground region is an upper end region in the image that is generated by the image composition. In this case, the width of the foreground region is equal to the width of the foreground patch. The height of the foreground region is randomly selected from a range from MIN_VAL to the height of the foreground patch—the width of the margin—MIN_VAL and fixed. The MIN_VAL is a predetermined value that represents the minimum value of the width or height of the foreground region and the background region (for example, MIN_VAL=10 pixels).

Figure 6E:
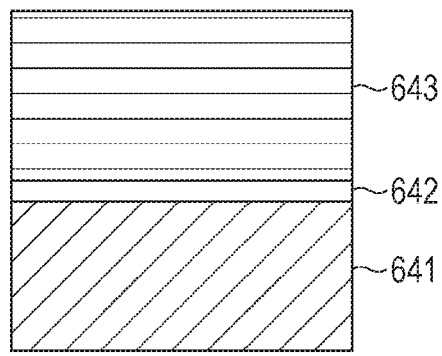
Figure 6B:
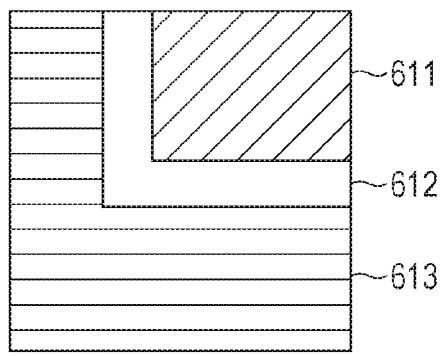

When the direction of the foreground with respect to the background is the upper right direction, as illustrated in a region 611 in FIG. 6B, the foreground region is an upper right end region in the image that is generated by the image composition. In this case, the width of the foreground region is randomly selected from a range from MIN_VAL to the width of the foreground patch—the width of the margin—MIN_VAL and fixed. The height of the foreground region is randomly selected from a range from MIN_VAL to the height of the foreground patch—the width of the margin—MIN_VAL and fixed.

Figure 6F:
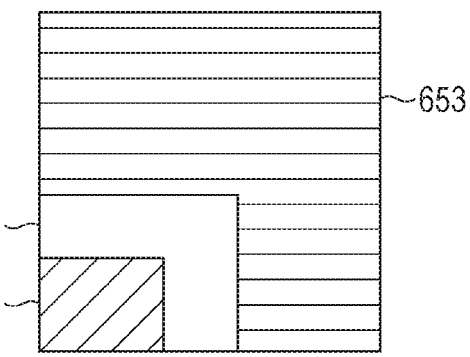
Figure 6C:
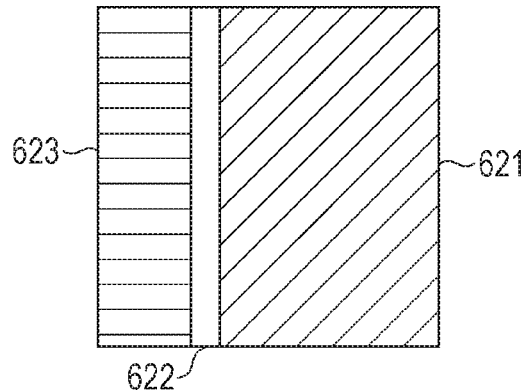

When the direction of the foreground with respect to the background is the right direction, as illustrated in a region 621 in FIG. 6C, the foreground region is a right end region in the image that is generated by the image composition. In this case, the width of the foreground region is randomly selected from a range from MIN_VAL to the width of the foreground patch—the width of the margin—MIN_VAL and fixed. The height of the foreground region is equal to the height of the foreground patch.

Figure 6G:
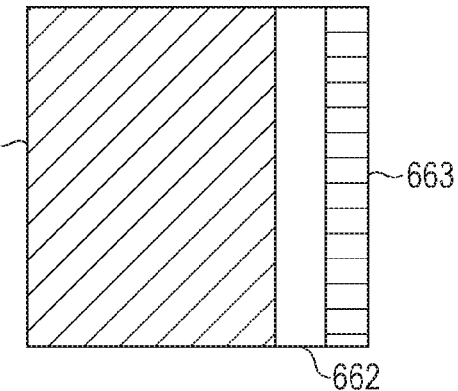
Figure 6D:
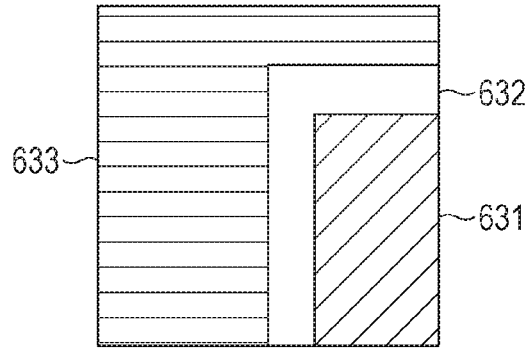

When the direction of the foreground with respect to the background is the lower right direction, as illustrated in a region 631 in FIG. 6D, the foreground region is a lower right end region in the image that is generated by the image composition. In this case, the width of the foreground region is randomly selected from a range from MIN_VAL to the width of the foreground patch—the width of the margin—MIN_VAL and fixed. The height of the foreground region is randomly selected from a range from MIN_VAL to the height of the foreground patch—the width of the margin—MIN_VAL and fixed.

When the direction of the foreground with respect to the background is the downward direction, as illustrated in a region 641 in FIG. 6E, the foreground region is a lower end region in the image that is generated by the image composition. In this case, the width of the foreground region is equal to the width of the foreground patch. The height of the foreground region is randomly selected from a range from MIN_VAL to the height of the foreground patch—the width of the margin—MIN_VAL and fixed.

When the direction of the foreground with respect to the background is the lower left direction, as illustrated in a region 651 in FIG. 6F, the foreground region is a lower left end region in the image that is generated by the image composition. In this case, the width of the foreground region is randomly selected from a range from MIN_VAL to the width of the foreground patch—the width of the margin—MIN_VAL and fixed. The height of the foreground region is randomly selected from a range from MIN_VAL to the height of the foreground patch—the width of the margin—MIN_VAL and fixed.

When the direction of the foreground with respect to the background is the left direction, as illustrated in a region 661 in FIG. 6G, the foreground region is a left end region in the image that is generated by the image composition. In this case, the width of the foreground region is randomly selected from a range from MIN_VAL to the width of the background patch—the width of the margin—MIN_VAL and fixed. The height of the foreground region is equal to the height of the foreground patch.

Figure 6H:
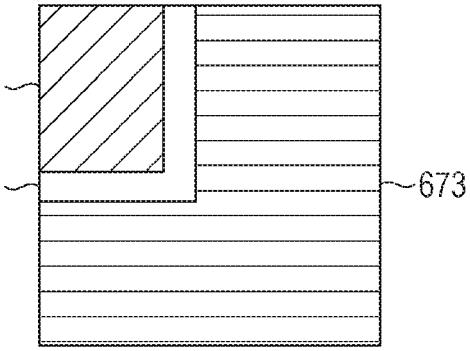

When the direction of the foreground with respect to the background is the upper left direction, as illustrated in a region 671 in FIG. 6H, the foreground region is an upper left end region in the image that is generated by the image composition. In this case, the width of the foreground region is randomly selected from a range from MIN_VAL to the width of the foreground patch—the width of the margin—MIN_VAL and fixed. The height of the foreground region is randomly selected from a range from MIN_VAL to the height of the foreground patch—the width of the margin—MIN_VAL and fixed.

The margin region having the fixed width as above is provided so as to be adjacent to the foreground region. The margin region is fixed in the direction of the foreground with respect to the background as illustrated in a region 602, a region 612, a region 622, a region 632, a region 642, a region 652, a region 662, and a region 672 in FIG. 6A to FIG. 6H by way of example.

A region other than the foreground region and the margin region is the background region in the image that is generated by the image composition as illustrated in a region 603, a region 613, a region 623, a region 633, a region 643, a region 653, a region 663, and a region 673 in FIG. 6A to FIG. 6H by way of example.

When the direction of the foreground with respect to the background is the upper right direction, the lower right direction, the lower left direction, or the upper left direction, two sides of the foreground region are in contact with the margin region. The width of the margin region in contact with the two sides is constant in the above description but may be randomly fixed for each side.

At S513, the CPU 231 cuts out the partial image corresponding to the foreground region that is fixed at S512 from the foreground patch and the correct label image for the foreground patch.

At S514, the CPU 231 cuts out the partial image corresponding to the background region that is fixed at S512 from the background patch.

At S515, the CPU 231 generates the input image that is used for the training data by the image composition. The CPU 231 generates the image data that has the same size as that of the foreground patch as a base image with all of the pixel values of the image data corresponding to white (the pixel values are 255 or are randomly selected from a range from 255 to a value slightly different from 255, for example, 255 to 250). The CPU 231 pastes the partial image of the foreground patch that is cut out at S513 into the base image at the position of the foreground region that is fixed at S512 for composition. The CPU 231 pastes the partial image of the background patch that is cut out at S514 into the base image at the position of the background region that is fixed at S512 for composition. Composite image data that is thus generated by the image composition is used as the input image for the training data.

Figure 14A:
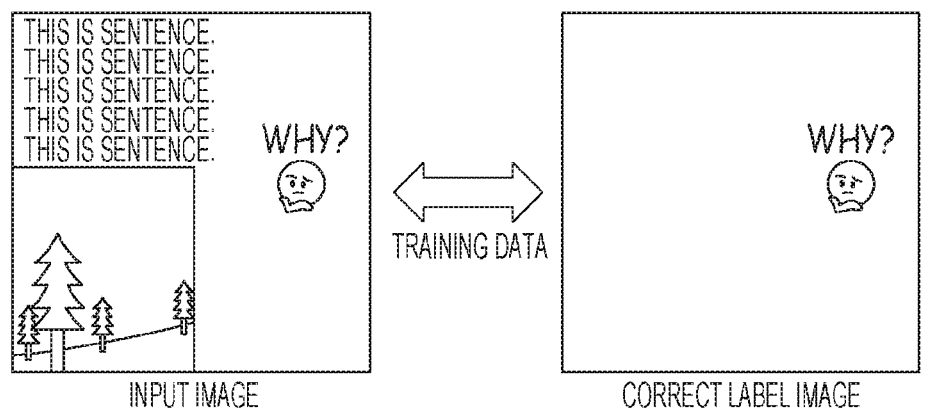
FIG. 14A illustrates an example of the structure of training data.

At S516, the CPU 231 generates the correct label image for the training data by the image composition. The CPU 231 generates the image data that has the same size as that of the input image with all of the pixels of the image data exhibiting non-manuscript values. The CPU 231 pastes the partial image of the correct label image that is cut out at S513 into the image data at the position of the foreground region that is fixed at S512 for composition. The image data that is thus generated by the image composition is used as the correct label image for the training data. The structure of the training data is illustrated in FIG. 14A. FIG. 14A illustrates an example of the structure of the training data.

At S517, the CPU 231 associates the input image that is generated by the image composition at S515 and the correct label image that is generated by the image composition at S516 with each other, and the images are saved as the training data in a predetermined region of the storage 235.

According to the present embodiment, the training data illustrated in FIG. 14A is saved.

At S518, the CPU 231 determines whether the training data generating process is ended. If the number of pieces of the training data that are generated is a predetermined number (designated and fixed by the user by using the input device 209 of the image-processing apparatus 101 at the beginning of the flowchart), the CPU 231 determines that the result is YES, and the process is ended. If not, the result of determination is NO, and the flow returns to S501.

Training Process

Figure 7:
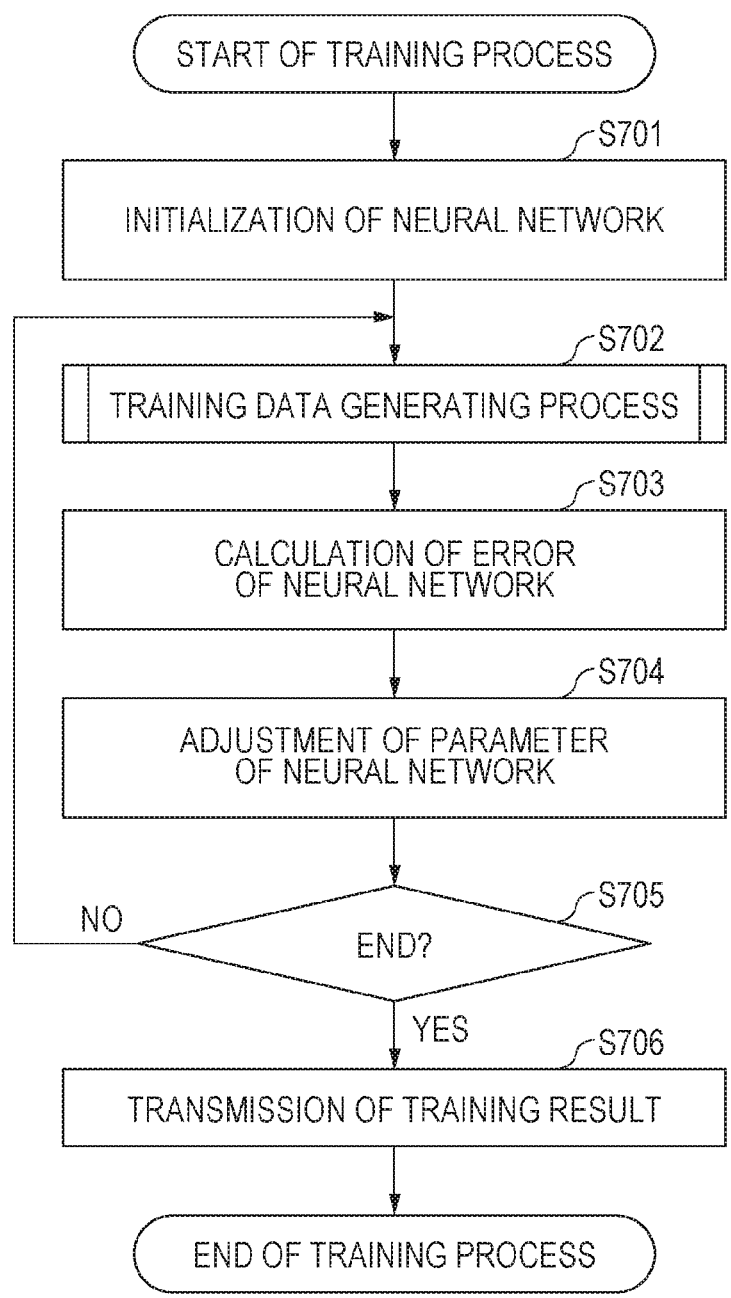
FIG. 7 illustrates the flow of a training process.

The training process of the training apparatus 102 will now be described. FIG. 7 illustrates the flow of the training process.

The process is performed by the training unit 113 of the training apparatus 102. This is started when the user carries out predetermined operation by using the input device 209 of the image-processing apparatus 101. According to the present embodiment, a mini-batch method is used for the training of the neural network.

At S701, the CPU 231 first initializes the neural network. That is, the CPU 231 creates the neural network and randomly fixes parameters of the neural network for initialization. The structure of the neural network that is created can be one of various structures, and an example thereof can be the form of a FCN (Fully Convolutional Network), which is a known technique.

At S702, the CPU 231 obtains the training data. The CPU 231 performs the training data generating process illustrated in the flowchart in FIG. 5 to obtain the predetermined number of pieces of the training data (a mini-batch size is, for example, 10).

At S703, the CPU 231 calculates an error of the neural network. That is, the input image that is included in the training data is inputted into the neural network to obtain an output. The output is an image that has the same size as that of the input image, the image in which the pixel value of the pixel that is determined to be presumably the manuscript is the manuscript value, and the pixel value of the pixel that is determined not to be presumably the manuscript is the non-manuscript value. A difference between the output and the correct label image is evaluated to obtain the error. Cross entropy can be used as an indication of the evaluation.

At S704, the CPU 231 adjusts the parameters of the neural network. That is, the values of the parameters of the neural network are changed by a backpropagation method on the basis of the error that is calculated at S703.

At S705, the CPU 231 determines whether training is ended. This is done in the following manner. The CPU 231 determines whether the processes at S702 to S704 are performed predetermined times (for example, 60000 times). The predetermined times can be inputted by the user at the beginning of the flowchart and fixed. If the processes are performed the predetermined times, the result of determination is YES, and the flow proceeds to S706. If not, the flow returns to S702, and the training of the neural network is continued.

At S706, the CPU 231 transmits the parameters of the neural network that are adjusted at S704 as the training result to the image-processing server 103.

Manuscript Removal Requesting Process

A manuscript removal requesting process of the image-processing apparatus 101 will now be described. The image-processing apparatus 101 scans the original that contains the manuscript. The scan image data is transmitted to the image-processing server 103, and removal of the manuscript is requested. FIG. 8A illustrates the flow of the manuscript removal requesting process. The process is performed in a manner in which the CPU 201 of the image-processing apparatus 101 reads a control program that is recorded in the storage 208 and loads the control program onto the RAM 204. This is started when the user carries out predetermined operation by using the input device 209 of the image-processing apparatus 101.

At S801, the CPU 201 first controls the scanner device 206 and the original-conveying device 207 and scans the original to generate the image to be processed. The image to be processed is generated as full color (three channels: RGB) image data.

At S802, the CPU 201 transmits an object that is generated at S801 and that is a target in which the manuscript is processed to the image-processing server 103 via the external interface 211.

At S803, the CPU 201 determines whether a processing result is received from the image-processing server 103. If the processing result is received from the image-processing server 103 via the external interface 211, the result of determination is YES, and the flow proceeds to S804. If not, the result of determination is NO, and a processing step at S803 is repeated.

At S804, the CPU 201 outputs the image data in which the manuscript is removed from the processing result that is received from the image-processing server 103, that is, the image to be processed that is generated at S801. In other words, the image data that is outputted is obtained by deleting only the manuscript in the captured image. An output method can be printing of the image data in which the manuscript is removed by using the printer device 205. Alternatively, the image data in which the manuscript is removed can be transmitted to a destination of transmission that the user sets by operating the input device 209 via the external interface 211.

Manuscript Removing Process

Figure 8B:
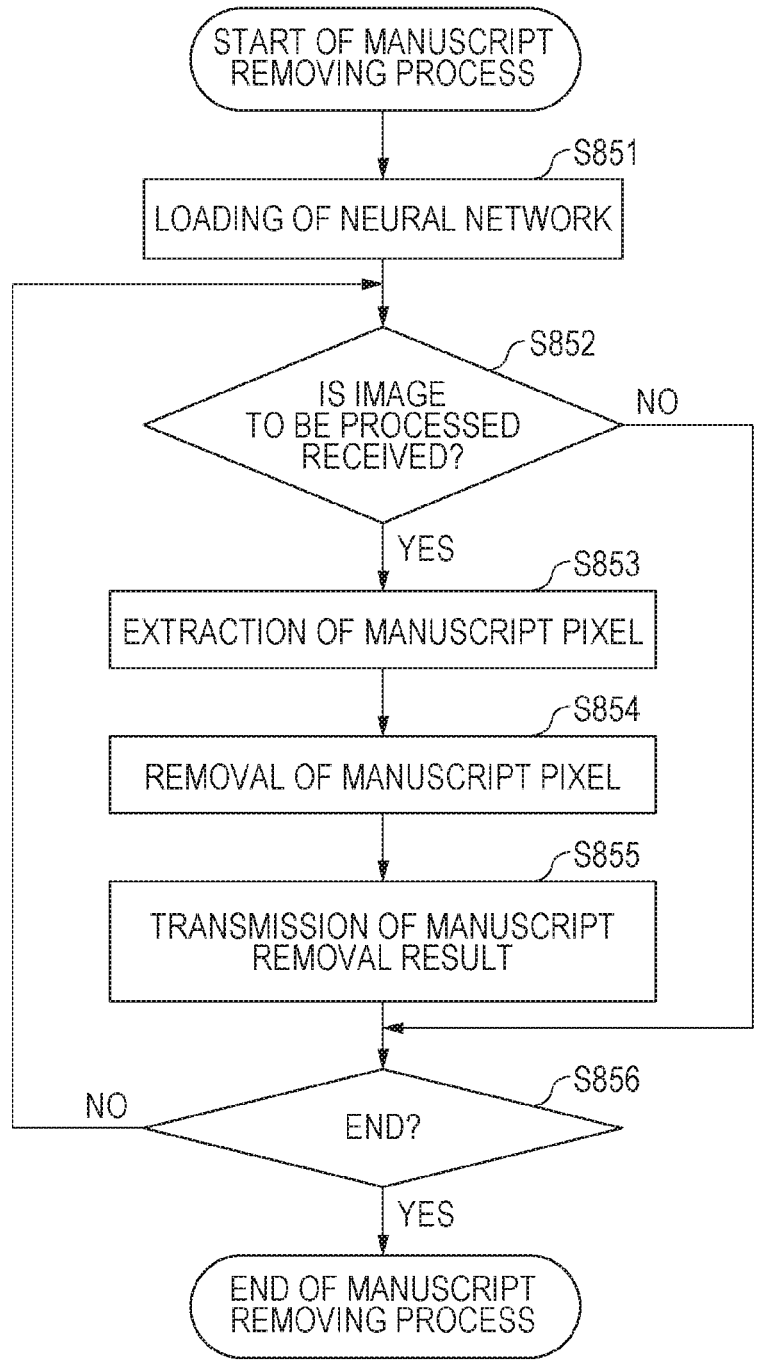
FIG. 8B illustrates the flow of a manuscript removing process.

A manuscript removing process of the image-processing server 103 will now be described. The image-processing server 103 performs the manuscript removing process on the image to be processed that is received from the image-processing apparatus 101. FIG. 8B illustrates the flow of the manuscript removing process. The process is performed in a manner in which the CPU 261 reads an image processing server program that is stored in the storage 265 and loads the image processing server program onto the RAM 264. This is started when the user powers ON the image-processing server 103.

At S851, the CPU 261 first loads the neural network for the manuscript extraction. The CPU 261 creates the same neural network as in the case of S701 in the flowchart in FIG. 7. The training result (the parameters of the neural network) that is transmitted from the training apparatus 102 at S706 in the flowchart in FIG. 7 is reflected on the created neural network.

At S852, the CPU 261 determines whether the image to be processed is received from the image-processing apparatus 101. If the image to be processed is received via the external interface 268, the result of determination is YES, and the flow proceeds to S853. If not, the result of determination is NO, and the flow proceeds to S856.

At S853, the CPU 261 extracts the manuscript pixel from the image to be processed that is received from the image-processing apparatus 101. The CPU 261 creates a grayscale image from the image to be processed. The grayscale image from the image to be processed is inputted into the neural network that is created at S851 to presume the manuscript pixel. The image data that is obtained as the output of the neural network is as follows: image data that has the same size as that of the image to be processed, the image data in which the pixel value of the pixel that is determined to be presumably the manuscript is the manuscript value, and the pixel value of the pixel that is determined not to be presumably the manuscript is the non-manuscript value. The image data is referred to as a "manuscript-extracted image".

At S854, the CPU 261 removes the manuscript from the image to be processed on the basis of the manuscript-extracted image that is obtained at S853. The CPU 261 changes the color of the pixel of the image to be processed that is located at the same position as that of the pixel in the manuscript-extracted image the pixel value of which is the manuscript value, into white (RGB=(255, 255, 255)).

At S855, the CPU 261 transmits the processed image in which the manuscript is removed to the image-processing apparatus 101 via the external interface 268.

At S856, the CPU 261 determines whether the process is ended. If the user carries out predetermined operation, for example, the image-processing server 103 is powered off, the result of determination is YES, and the process is ended. If not, the result of determination is NO, and the flow returns to S852.

Remark

As described above according to the present embodiment, the training data for training the neural network for the manuscript extraction can be generated by compositing the image data that contains only the manuscript and the image data that contains only the printed content such that the manuscript and the printed content do not overlap. The neural network is trained by using the training data. The manuscript can be extracted and removed from the scan image data by using the result of the training.

According to the present embodiment, the manuscript character is removed in processing of the image to be processed at S360. However, the processing of the image to be processed is not limited to removal of the manuscript character. For example, the processing may be such that the manuscript character is emphasized as in an image 2204.

Second Embodiment

In a case described according to the present embodiment, a method that differs from that according to the first embodiment is used as the method of generating the training data by the image composition. According to the present embodiment, when the input image for the training data is composited, an image that is scanned by the image-processing apparatus 101 is used as the base image. This process enables an image close to the actual scan image data to be generated by the image composition. The structure of an image-processing system according to a second embodiment is the same as the structure of the image-processing system according to the first embodiment except for some features. Accordingly, like components are designated by like reference characters, and a detailed description thereof is omitted.

Sample Image Obtaining Process

A sample image obtaining process of the image-processing apparatus 101 according to the present embodiment will be described. FIG. 9A illustrates the flow of the sample image obtaining process according to the second embodiment. The process is performed in a manner in which the CPU 201 reads a control program that is recorded in the storage 208 and loads the control program onto the RAM 204. This is started when the user operates the input device 209 of the image-processing apparatus 101.

The processing steps of the processes at S401 to S406 are the same as the processing steps designated by the same reference characters in the flowchart in FIG. 4A. According to the present embodiment, if the result of determination is NO at S404, the flow proceeds to S901.

At S901, the CPU 201 determines whether scanning of the original used for the margin is instructed. If the user carries out predetermined operation for scanning the original used for the margin by using the input device 209, the result of determination is YES, and the flow proceeds to S902. If not, the result of determination is NO, and the flow proceeds to S407.

At S902, the CPU 201 controls the scanner device 206 and the original-conveying device 207 and scans the original to generate image data (the image data is referred to below as a "margin sample image"). The original is paper on which neither the manuscript nor the printed content is contained. The margin sample image is generated as full color (three channels: RGB) image data.

At S903, the CPU 201 transmits the margin sample image that is generated at S902 to the training apparatus 102 via the external interface 211. At this time, the margin sample image is transmitted with attached information representing that the image data that is transmitted is data of the margin sample image.

The processing step of the process at S407 is the same as the processing step designated by the same reference character in the flowchart in FIG. 4A.

Through the above processes, the image-processing apparatus 101 generates the margin sample image and transmits the margin sample image to the training apparatus 102 in addition to the foreground sample image and the background sample image. The foreground sample images, the background sample images, and the margin sample images are obtained depending on the operation of the user and the number of the originals that are placed on the original-conveying device 207.

Sample Image Receiving Process

Figure 9B:
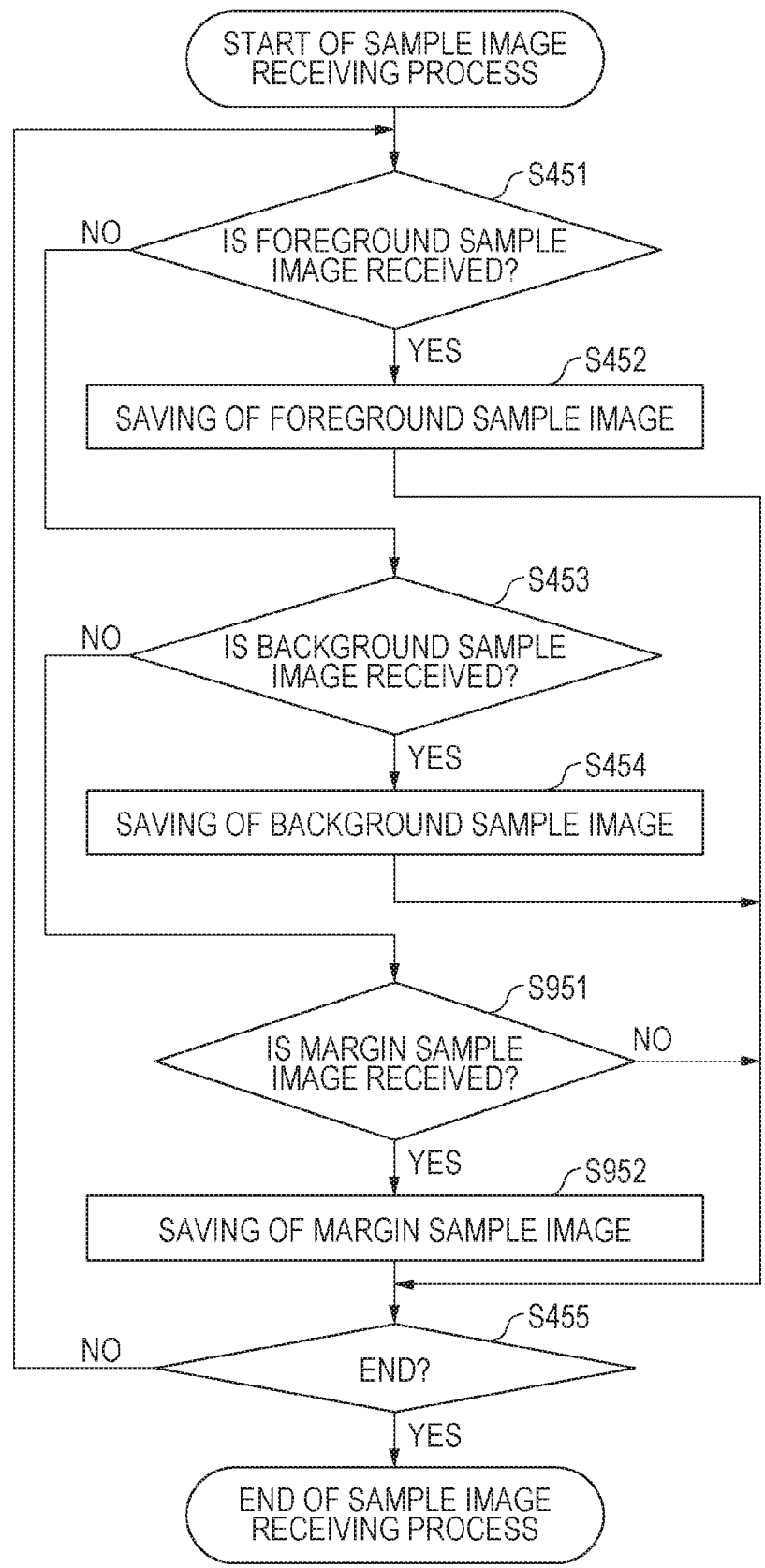
FIG. 9B illustrates the flow of a sample image receiving process according to the second embodiment.

A sample image receiving process of the training apparatus 102 according to the present embodiment will now be described. FIG. 9B illustrates the flow of the sample image receiving process according to the second embodiment. The process is performed in a manner in which the CPU 231 reads the training data generating program that is recorded in the storage 235 and loads the training data generating program onto the RAM 234. This is started when the user powers ON the training apparatus 102.

The processing steps of the processes at S451 to S454 are the same as the processing steps designated by the same reference characters in the flowchart in FIG. 4B. According to the present embodiment, if the result of determination is NO at S453, the flow proceeds to S951.

At S951, the CPU 231 determines whether the margin sample image is received. If the image data is received via the external interface 238, and the information representing that the image data is data of the margin sample image is attached, the CPU 231 determines that the result is YES, and the flow proceeds to S952. If not, the result of determination is NO, and the flow proceeds to S455.

At S952, the CPU 231 causes the storage 235 to save the received margin sample image in a predetermined region.

Training Data Generating Process

A training data generating process of the training apparatus 102 according to the present embodiment will now be described.

Figure 10:
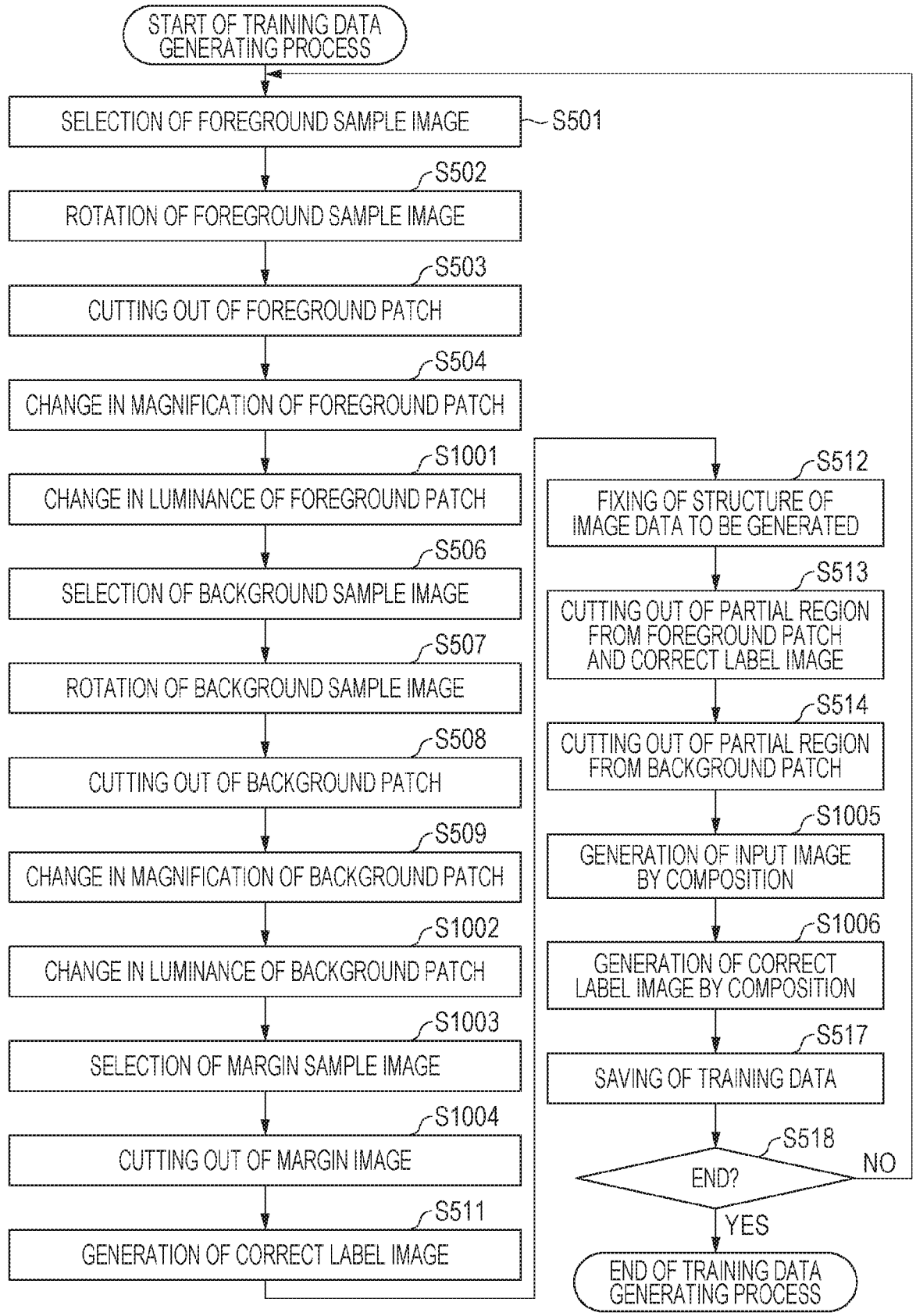
FIG. 10 illustrates the flow of a training data generating process according to the second embodiment.

FIG. 10 illustrates the flow of the training data generating process according to the second embodiment. The process is performed by the training-data-generating unit 112 of the training apparatus 102. This is started when the user carries out predetermined operation by using the input device 236 of the training apparatus 102.

The processing steps of the processes at S501 to S504 are the same as the processing steps designated by the same reference characters in the flowchart in FIG. 5.

At S1001, the CPU 231 processes the foreground patch by changing the luminance of each pixel. The CPU 231 changes the luminance of the foreground patch by using the gamma correction. The gamma value is randomly selected from a predetermined range (for example, from 0.1 to 10.0) and fixed.

The processing steps of the processes at S506 to S509 are the same as the processing steps designated by the same reference characters in the flowchart in FIG. 5.

At S1002, the CPU 231 processes the background patch by changing the luminance of each pixel. The CPU 231 changes the luminance of the background patch by using the gamma correction. The gamma value is randomly selected from a predetermined range (for example, from 0.1 to 10.0) and fixed.

At S1003, the CPU 231 selects and reads one of the margin sample images that are stored in the storage 235. In a processing step at S952 in the flowchart in FIG. 9B, the margin sample images are recorded in the storage 235. Accordingly, one of the margin sample images is randomly selected therefrom.

At S1004, the CPU 231 generates image data by cutting out a part (the same size as when the foreground patch is cut out at S503) of the margin sample image, and the image data is used as the base image. The position at which the part is cut out is randomly fixed.

The processing steps of the processes at S511 to S514 are the same as the processing steps designated by the same reference characters in the flowchart in FIG. 5.

At S1005, the CPU 231 generates the input image for the training data by the image composition. The CPU 231 pastes the partial image of the foreground patch that is cut out at S513 into the base image that is generated at S1004 at the position of the foreground region that is fixed at S512 for composition. The CPU 231 pastes the partial image of the background patch that is cut out S514 into the base image at the position of the background region that is fixed at S512 for composition. A grayscale image is created from the image that is generated by the image composition. The image that is thus generated is used as the input image for the training data.

At S1006, the CPU 231 generates the correct label image for the training data by the image composition. This processing step is the same as that at S516 in the flowchart in FIG. 5. In addition, a grayscale correct label image is created from the correct label image that is generated by the image composition.

The processing steps of the processes at S517 and S518 are the same as the processing steps designated by the same reference characters in the flowchart in FIG. 5.

Remark

The scan image data that is generated by scanning paper on which neither the manuscript nor the printed content is contained can be used for the base image as described above. This enables the input image for the training data that is generated by the image composition to be close to the actual scan image data.

In some cases, the manuscript is entered even in a non-white margin region of paper on which the printed content is contained. For example, it is thought that the manuscript is entered in a light, solid color region. To extract the manuscript in such a region, the original that is scanned at S902 can be not only a blank sheet but also an original in which a light, solid color is printed and colored paper. In this case, at S1005, the input image for the training data is composited with the base image by alpha blending so as to pass through a non-manuscript pixel of the partial image of the foreground patch.

Third Embodiment

In a case described according to the present embodiment, a method that differs from those according to the first and second embodiments is used as the method of generating the image for the training data by the image composition. According to the present embodiment, a margin is detected from the background sample image, and the foreground patch is composited at the position of the margin. This process enables the image for the training data that is generated by the image composition to be close to an image in which the manuscript character is entered in the margin. The structure of an image-processing system according to a third embodiment is the same as the structures of the image-processing systems according to the first and second embodiments except for some features. Accordingly, like components are designated by like reference characters, and a detailed description thereof is omitted.

Training Data Generating Process

Figure 11:
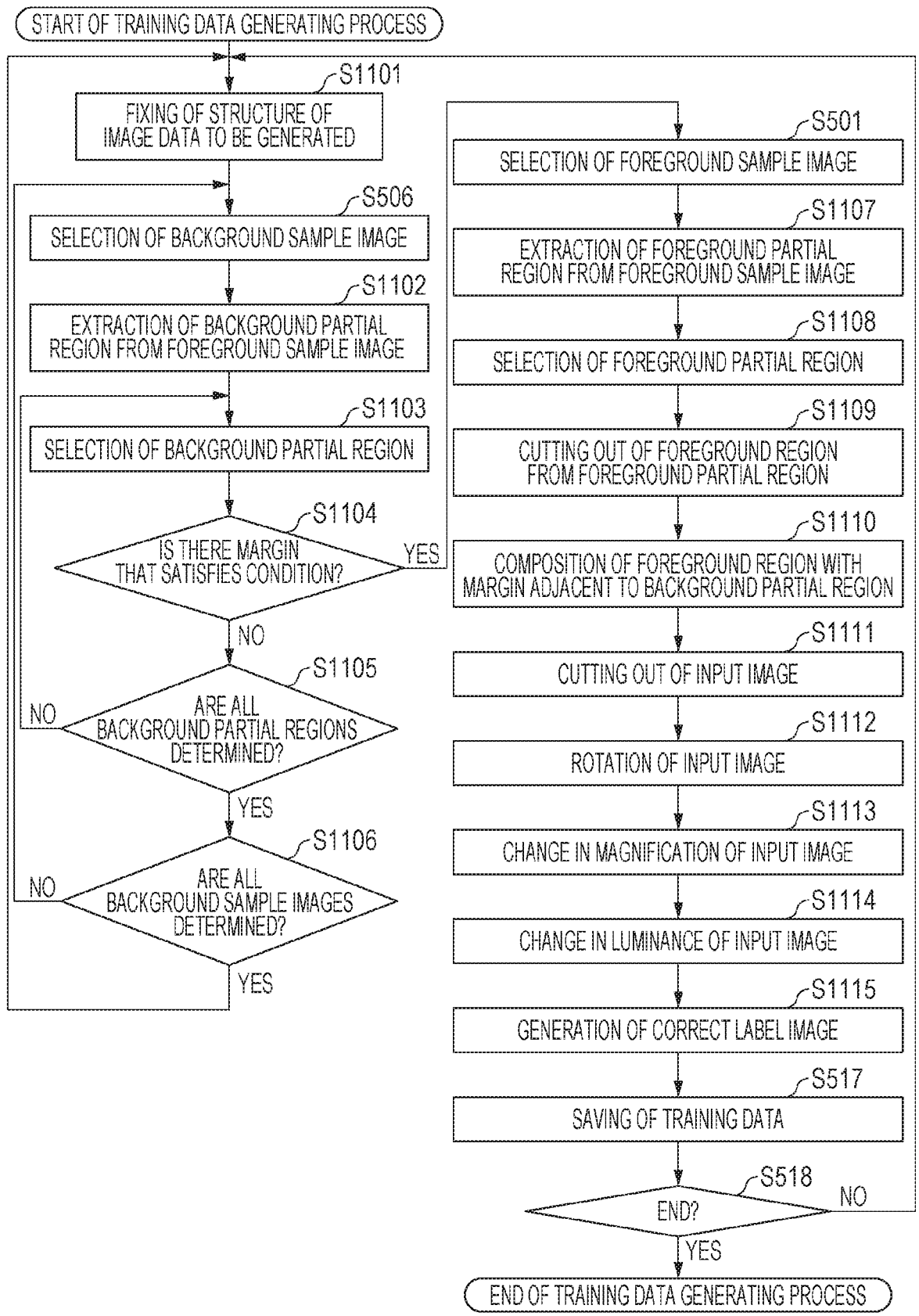
FIG. 11 illustrates the flow of a training data generating process according to a third embodiment.

A training data generating process of the training apparatus 102 according to the present embodiment will be described. FIG. 11 illustrates the flow of the training data generating process according to the third embodiment. The process is performed by the training-data-generating unit 112 of the training apparatus 102. This is started when the user carries out predetermined operation by using the input device 236 of the training apparatus 102.

At S1101, the CPU 231 first fixes the structure of the image data that is generated by the image composition. This is the same as the processing step of the process at S512 in the flowchart in FIG. 5. According to the present embodiment, the direction of the foreground with respect to the background is randomly selected from four directions of the upper direction, the right direction, the downward direction, and the left direction and fixed. The structure of the image data that is generated by the image composition is fixed as illustrated in FIG. 6A, FIG. 6C, FIG. 6E, and FIG. 6G.

The processing step of the process at S506 is the same as the processing step designated by the same reference character in the flowchart in FIG. 5.

At S1102, the CPU 231 extracts a partial region from the background sample image that is selected and read. The partial region corresponds to a bundle of the printed contents (object), and examples of the object include a character column that includes characters, a sentence that includes the character columns, a figure, a picture, a table, and a graph. A method of extracting the partial region can be, for example, as follows. A binarization image is generated by black and white binarization of the background sample image. A portion (connected black pixels) at which black pixels are connected to each other in the binarization image is extracted, and the circumscribed rectangles thereof are created. The shape and size of each rectangle is evaluated. This enables a rectangle group of a character or a part of the character to be obtained. A distance between the rectangles in the rectangle group is evaluated, and the rectangles the distance of which is equal to or less than a predetermined threshold are integrated. This enables the rectangle group of the character to be obtained. In the case where the rectangles of the characters having the same size are arranged near each other, a rectangle group of a character column can be obtained by integrating the rectangles. In the case where the rectangles of the character columns having the same short side length are arranged at a regular interval, a rectangle group of a sentence can be obtained by integrating the rectangles. A rectangle that contains an object other than the character, the column, and the sentence, such as a figure, a picture, a table, and a graph, can also be obtained. A rectangle of a single character or a part of the character is excluded from the rectangles that are thus extracted. The remaining rectangle corresponds to the partial region. FIG. 18 illustrates examples of the partial region that is extracted from the background sample image. FIG. 18 illustrates examples of the result of extraction of the partial region from the background sample image. The examples of the partial region are illustrated by dashed lines. The partial region that is extracted from the background sample image in this processing step is referred to as the "background partial region". In this processing step, the background partial regions can be extracted from the background sample image.

At S1103, the CPU 231 randomly selects one of the background partial regions that are extracted at S1102.

Figure 19A:
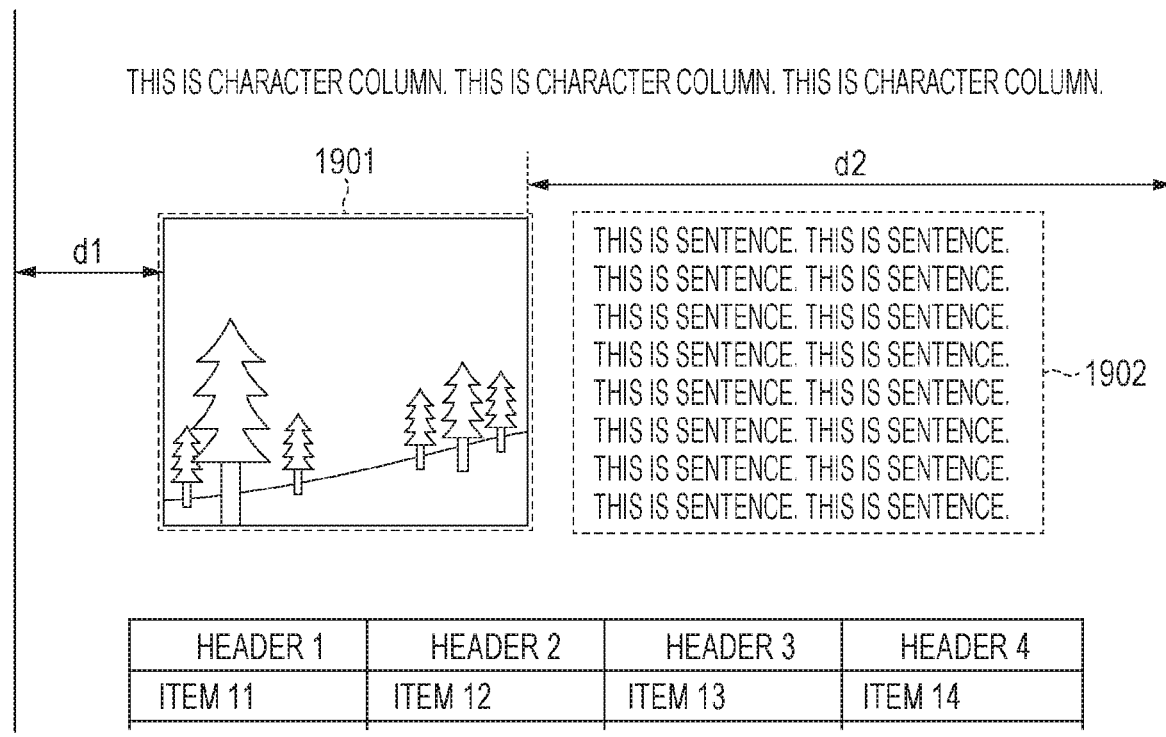
FIG. 19A illustrates the background partial region.
Figure 19B:
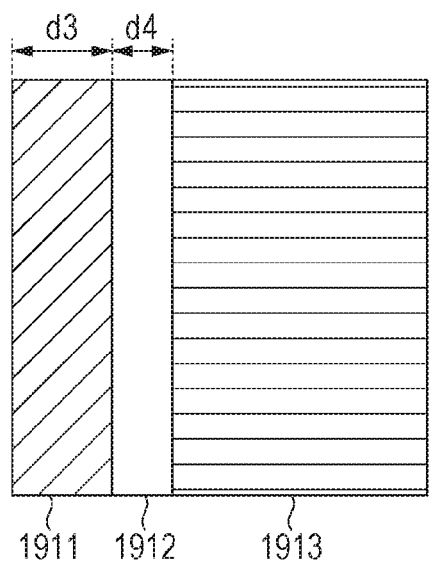
FIG. 19B illustrates the structure of the input image that is generated.
Figure 19C:
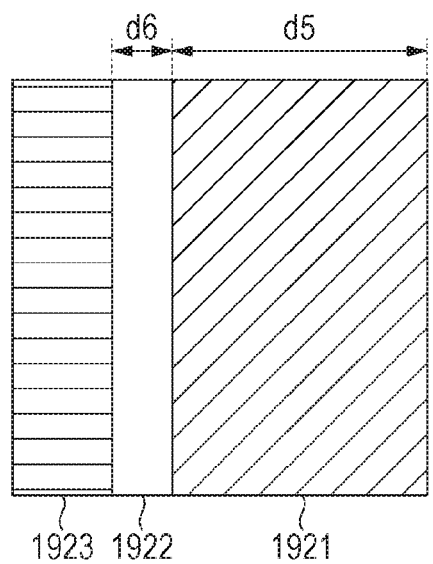
FIG. 19C illustrates the structure of the input image that is generated.

At S1104, the CPU 231 determines whether the background partial region that is selected at S1103 is adjacent to the margin that satisfies a positional relationship that is fixed at S1101. The margin means a set of the pixels that are in the background sample image and that do not belong to any background partial region. In this processing step, whether there is the margin near which the foreground can be composited is determined when a part or the entire background partial region is composited to be the background region of the image to be generated. For example, in the case where the direction of the foreground with respect to the background is fixed to be the left direction at S1101, this is determined as follows. A distance (number of the pixels) between the left end of the background partial region and the left end of the background sample image is more than a value obtained by adding the width of the foreground region and the width of the margin region in the image that is generated by the image composition. In addition, neither another background partial region nor the rectangle of the single character or the part of the character that is extracted at S1102 are present between the left end of the background partial region and a location away therefrom by the value obtained by adding the width of the foreground region and the width of the margin region. An example is described with reference to FIG. 19A to 19C. FIG. 19A illustrates the background partial region. FIG. 19B illustrates the structure of the input image that is generated. FIG. 19C illustrates the structure of the input image that is generated.

In the example, a background partial region 1901 is selected at S1103. A distance between the left end of the background partial region 1901 and the left end of the background sample image is designated by d1 as illustrated. The structure of the image to be composited is fixed at S1101 as illustrated in FIG. 19B (a foreground region 1911, a margin region 1912, and a background region 1913). As illustrated, the width of the foreground region 1911 is designated by d3, and the width of the margin region 1912 is designated by d4. As illustrated, neither another background partial region nor the rectangle of the single character or the part of the character are present between the left end of the background partial region 1901 and a location a distance of a d3+d4 away therefrom. At this time, if d1≥d3+d4 is satisfied, it is determined that the background partial region 1901 is adjacent to the margin that satisfies the positional relationship that is fixed at S101. If d1<d3+d4 is satisfied, it is determined that the background partial region 1901 is not adjacent thereto. Also in the case where the direction of the foreground with respect to the background is fixed to be the upward direction, the right direction, or the downward direction at S1101, the same determination is made. In another example, the direction of the foreground with respect to the background is fixed to be the right direction at S1101, and the structure of the image to be composited is fixed as illustrated in FIG. 19C (a foreground region 1921, a margin region 1922, and a background region 1923). The width d5 of the foreground region and the width d6 of the margin region satisfy d2>d5+d6, where d2 is a distance between the right end of the background partial region 1901 and the right end of the background sample image. However, a background partial region 1902 is present between the right end of the background partial region 1901 and a location a distance of d5+d6 away therefrom. Accordingly, this case is determined that the background partial region that is selected at S1103 is not adjacent to the margin that satisfies the positional relationship that is fixed at S1101. If the background partial region that is selected at S1103 is adjacent to the margin that satisfies the positional relationship that is fixed at S1101 as described above, the result of determination is YES, and the flow proceeds to S501. If not, the result of determination is NO, and the flow proceeds to S1105.

At S1105, the CPU 231 determines whether the determination at S1104 is made on all of the background partial regions that are extracted at S1102 for the background sample image that is selected at S506. If the determination is made, the result of determination is YES, and the flow proceeds to S1106. This is the case where the positional relationship that is fixed at S1101 is not satisfied in any background partial region that is extracted from the currently selected background sample image. If not, the result of determination is NO, and the flow returns to S1103. This is the case where since the positional relationship that is fixed at S1101 is not satisfied in the currently selected background partial region, the flow returns to S1103 to select another background partial region. The background partial region that is previously selected is not selected when the processing step at S1103 is performed again until the result of determination becomes YES at S1104 or the structure of the image data that is generated by the image composition is fixed again at S1101.

At S1106, the CPU 231 determines whether the determination at S1104 is made on all of the background sample images that are stored in the storage 235. If the determination is made, the result of determination is YES, and the flow returns to S1101. This is the case where since all of the background sample images that are store in the storage 235 do not contain the background partial region that satisfies the positional relationship that is fixed at S1101, the flow returns to S1101 to fix the positional relationship again. If not, the result of determination is NO, and the flow returns to S506. This is the case where the currently selected background sample image does not contain the background partial region that satisfies the positional relationship that is fixed at S1101, and the flow returns to step 506 to select another background sample image. The background sample image that is previously selected is not selected when the processing step at S506 is performed again until the result of determination becomes YES at S1104 or the structure of the image data that is generated by the image composition is fixed again at S1101.

The processing step of the process at S501 is the same as the processing step designated by the same reference character in the flowchart in FIG. 5.

At S1107, the CPU 231 extracts the partial region from the foreground sample image that is selected and read. The connected black pixels and the circumscribed rectangles thereof are extracted and evaluated in the same manner as in the process at S1102 to extract the partial region that contains a manuscript sentence or figure. The partial region that is extracted from the foreground sample image in this processing step is referred to as a "foreground partial region".

At S1108, the CPU 231 randomly selects one of the foreground partial regions that are extracted at S1107.

At S1109, the CPU 231 cuts out the partial image corresponding to the foreground region that is fixed at S1101 from the foreground partial region that is selected at S1108. In the case where the direction of the foreground with respect to the background is fixed to be the upward direction at S1101, a region depending on the shape and area of the foreground region is cut out from a lower end part of the foreground partial region. In the case where the direction of the foreground with respect to the background is the right direction, a region depending on the shape and area of the foreground region is cut out from a left end part of the foreground partial region. In the case where the direction of the foreground with respect to the background is the downward direction, a region depending on the shape and area of the foreground region is cut out from an upper end part of the foreground partial region. In the case where the direction of the foreground with respect to the background is the left direction, a region depending on the shape and area of the foreground region is cut out from a right end part of the foreground partial region.

At S1110, the CPU 231 composites the foreground region that is cut out at S1109 with the margin adjacent to the background partial region that is selected at S1103 in the background sample image at a position that is fixed at S1101.

At S1111, the CPU 231 cuts out, as the input image for the training data, the partial region that contains the foreground region that is composited at S1103 in the background sample image such that the structure that is fixed at S1101 is achieved.

At S1112, the CPU 231 processes the input image that is generated at S1111 by rotating the input image. The rotation angle is randomly selected from a predetermined range (for example, from −10 degrees to 10 degrees) and fixed.

At S1113, the CPU 231 processes the input image by changing the magnification. The ratio of the change in the magnification is randomly selected from a predetermined range (for example, from 50% to 150%) and fixed. In addition, the input image is updated by cutting out a central part (for example, a size of length×width=256×256) of the input image after the change in the magnification. When the input image is cut out at S1111, the input image is cut out with a size (for example, length×width=512×512 pixel) twice the size upon cutting out and updating in this processing step. Accordingly, the structure of the image data that is generated by the image composition is fixed on the assumption of the double size in the processing step at S1101 according to the present embodiment.

At S1114, the CPU 231 processes the input image by changing the luminance of each pixel. The CPU 231 creates a grayscale input image from the input image and changes the luminance of the foreground patch by using the gamma correction. The gamma value is randomly selected from a predetermined range (for example, from 0.1 to 10.0) and fixed.

At S1115, the CPU 231 generates the correct label image for the input image. The CPU 231 generates the correct label image by binarization of the input image such that the pixel value that is lower than the predetermined threshold is the manuscript value, and another pixel value is the non-manuscript value. The CPU 231 that rotates the input image at S1112 and changes the magnification at S1113 calculates a region corresponding to the foreground region in the input image after the rotation and the change in the magnification by using the rotation angle and the ratio of the change in the magnification. This is used to change the values of all of the pixels of the correct label image that do not correspond to the region into the non-manuscript values.

The processing steps of the processes at S517 and S518 are the same as the processing steps designated by the same reference characters in the flowchart in FIG. 5.

Remark

As described above according to the present embodiment, the margin region is extracted from the background sample image, and the partial image of the foreground sample image is composited with the region. The image for the training data that is generated by the image composition can be close to an actual image in which the manuscript is entered in the margin, and the training data for training the neural network for the manuscript extraction can be generated.

Fourth Embodiment

In a case described according to the present embodiment, a method that differs from those according to the first to third embodiments is used as the method of generating the image for the training data by the image composition. According to the present embodiment, the image for the training data that is generated by the image composition is suitable for extracting a manuscript character that is entered in a form. Specifically, a margin is detected in an entry column of the background sample image of a form in which nothing is entered, and the foreground patch is composited at a detected location. The structure of an image-processing system according to a fourth embodiment is the same as the structures of the image-processing systems according to the first to third embodiments except for some features. Accordingly, like components are designated by like reference characters, and a detailed description thereof is omitted.

Form Image

The background sample image generating process is described according to the first embodiment with reference to FIG. 4A. According to the present embodiment, when the background sample image is generated at S405, the form such as an application form in which nothing is entered is scanned. Various kinds of form originals are preferably scanned to deal with form originals having unknown styles.

Various kinds of the forms are scanned to generate the background sample images. An example of the form is illustrated in FIG. 12. FIG. 12 illustrates an outline of the background sample image generating process. Entry columns of the manuscript character in a form 1200 include a name entry column 1201 in which the name is entered, an address entry column 1202 in which the address is entered, and a phone number entry column 1203 in which the phone number is entered. Headlines for these entry columns include a name headline 1204 ("NAME"), an address headline 1205 ("ADDRESS"), and a phone number headline 1206 ("PHONE NUMBER"). When the foreground sample image is generated at S402, paper on which the manuscript sentence is entered in a line or about two lines is scanned on the assumption of contents that can be entered in the entry columns of the form.

Training Data Generating Process

Figure 13:
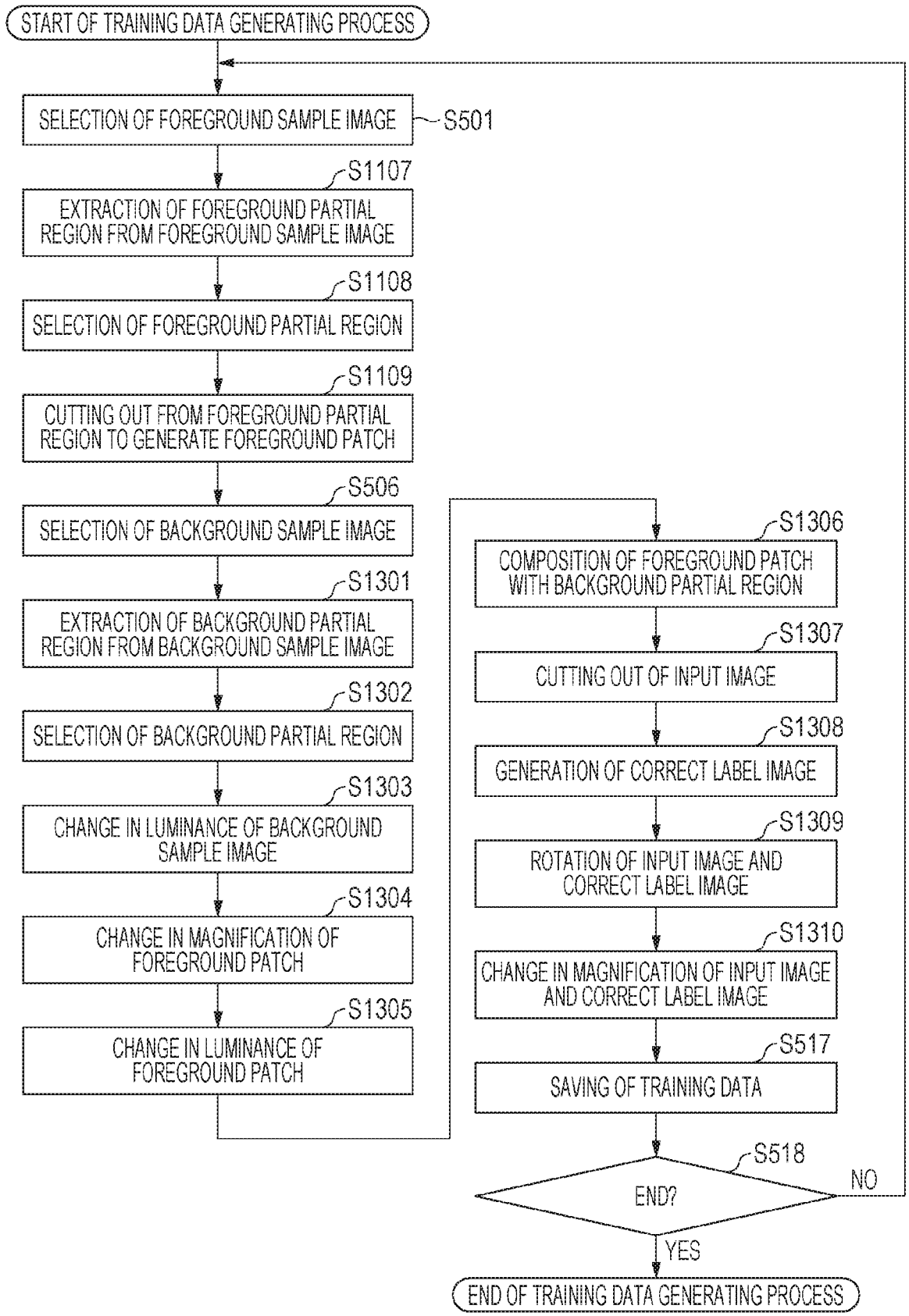
FIG. 13 illustrates the flow of a training data generating process according to a fourth embodiment.

A training data generating process of the training apparatus 102 according to the present embodiment will be described. FIG. 13 illustrates the flow of the training data generating process according to the fourth embodiment. The process is performed by the training-data-generating unit 112 of the training apparatus 102. This is started when the user carries out predetermined operation by using the input device 236 of the training apparatus 102.

The processing step of the process at S501 is the same as the processing step designated by the same reference character in the flowchart in FIG. 5.

The processing steps of the processes at S1107, S1108, and S1109 are the same as the processing steps designated by the same reference characters in the flowchart in FIG. 11.

The processing step of the process at S506 is the same as the processing step designated by the same reference character in the flowchart in FIG. 5.

At S1301, the CPU 231 extracts the background partial region from the background sample image that is selected and read. According to the present embodiment, the background partial region corresponds to the entry column of the form in which nothing is entered. A method of extracting the entry column as the background partial region can be, for example, as follows. A binarization image is generated by black and white binarization of the background sample image. A portion (connected black pixels) at which black pixels are connected to each other in the binarization image is extracted. A pixel block that is longer than a predetermined threshold (for example, for 50 pixels) and that is thinner than a predetermined threshold (for example, for 5 pixels) is extracted as a ruled line from a block of the extracted connected black pixels. At this time, the conditions of extraction of the ruled line may be such that the ruled line is substantially parallel to upper and lower edges of the image, and the ruled line is substantially parallel to left and right edges of the image. A region that is surrounded by four ruled lines, that includes the four rules lines, and that does not contain another block of the connected black pixels is extracted as the background partial region (entry column). This process enables one or more background partial regions to be extracted.

At S1302, the CPU 231 randomly selects one of the background partial regions that are extracted at S1301.

At S1303, the CPU 231 processes the background sample image by changing the luminance of each pixel. The CPU 231 creates a grayscale background sample image from the background sample image and changes the luminance of the foreground patch by using the gamma correction. The gamma value is randomly selected from a predetermined range (for example, from 0.1 to 10.0) and fixed.

At S1304, the CPU 231 processes the foreground patch by changing the magnification. The ratio of the change in the magnification is fixed, for example, as follows. A ratio RW of the width of the foreground patch to the width of the background partial region that is selected at S1302 and a ratio RH of the height of the foreground patch to the height of the background patch are obtained. Of the values of RW and RH, a larger value is used as a ratio R1. The ratio of the width (in the case where R1 is equal to RW) or the height (in the case where R1 is equal to RH) of the background patch to that of the foreground patch after the change in the magnification is randomly selected from a predetermined range (for example, 0.5 to 0.95) and fixed (the ratio is designated by R2). The ratio of the change in the magnification is R2/R1.

At S1305, the CPU 231 processes the foreground patch by changing the luminance of each pixel. The CPU 231 creates a grayscale foreground patch from the foreground patch and changes the luminance of foreground patch by using the gamma correction. The gamma value is randomly selected from a predetermined range (for example, from 0.1 to 10.0) and fixed.

At S1306, the CPU 231 composites the foreground patch with the selected background partial region of the background sample image. The position of the composition is randomly fixed such that the foreground patch is within the background partial region.

At S1307, the CPU 231 cuts out the partial region that contains the background partial region in which the foreground patch is composited to generate the input image. The position of cutting out is fixed as follows. The input image contains at least one of the four ruled lines of the background partial region. The input image contains the composited foreground patch in a predetermined proportion or more (for example, 25% or more in area). The position is randomly fixed within a range that satisfies the above conditions. In many typical cases, the entry column of the form has an oblong rectangle shape. Accordingly, regarding the proportion, ruled lines along left and right edges of an entry region are not included in many cases. For this reason, the position of cutting out may be fixed such that the ruled lines along the left and right edges are explicitly included.

At S1308, the CPU 231 generates the correct label image. The CPU 231 obtains the correct label image by binarization of the entire input image that is generated at S1307. At S1306, which region in the input image corresponds to the former foreground patch is calculated from the position at which the foreground patch is composited with the background partial region and the position at which the input image is cut out at S1307. The pixel value of the region in the correct label image other than the calculated region is changed into the non-manuscript value. The correct label image is thus obtained.

At S1309, the CPU 231 processes the input image and the correct label image by rotating the input image and the correct label image. The rotation angle for the input image and the rotation angle for the correct label image are equal to each other and are randomly selected from a predetermined range (for example, from −5 degrees to 5 degrees) and fixed.

At S1310, the CPU 231 processes the input image and the correct label image by changing the magnification. The ratio of the change in the magnification for the input image and the ratio of the change in the magnification for the correct label image are equal to each other and are randomly selected from a predetermined range (for example, 90% to 110%) and fixed. A part (for example, a size of length× width=256×256) of the foreground patch after the change in the magnification is cut out to update the foreground patch. At this time, the position of cutting out is fixed such that the region of the former foreground sample image, the region of the former background sample image, and the ruled lines are included.

The processing steps of the processes at S517 and S518 are the same as the processing steps designated by the same reference characters in the flowchart in FIG. 5.

Remark

As described above according to the present embodiment, the margin region corresponding to the entry column of the form is extracted from the background sample image, and the partial image of the foreground sample image is composited with the region. This enables the training data for training the neural network for the manuscript extraction to be generated by composition such that the manuscript and the printed content do not overlap.

Fifth Embodiment

In a case described according to the present embodiment, a method that differs from that according to the first embodiment is used as a method of using a result of recognition of the manuscript. In the method of using the result of recognition of the manuscript according to the present embodiment, useful information is extracted from the image to be processed. Specifically, a process (OCR process) is performed to extract text information from the original that contains type and the manuscript character, and the text information is used for, for example, data search. According to the present embodiment, a manuscript character image and a type image are separated from each other to improve the accuracy of the OCR process. According to the present embodiment, a process is performed to obtain information about a page structure, for example, which page contains the manuscript character in a document having pages. Data that is searchable as above is referred to as searchable data. Examples of the searchable data include searchable PDF and form data. The structure of an image-processing system according to a fifth embodiment is the same as those of the image-processing systems according to the first to fourth embodiments except for some features. Accordingly, like components are designated by like reference characters, and a detailed description thereof is omitted.

Image-Processing System

Figure 16A:
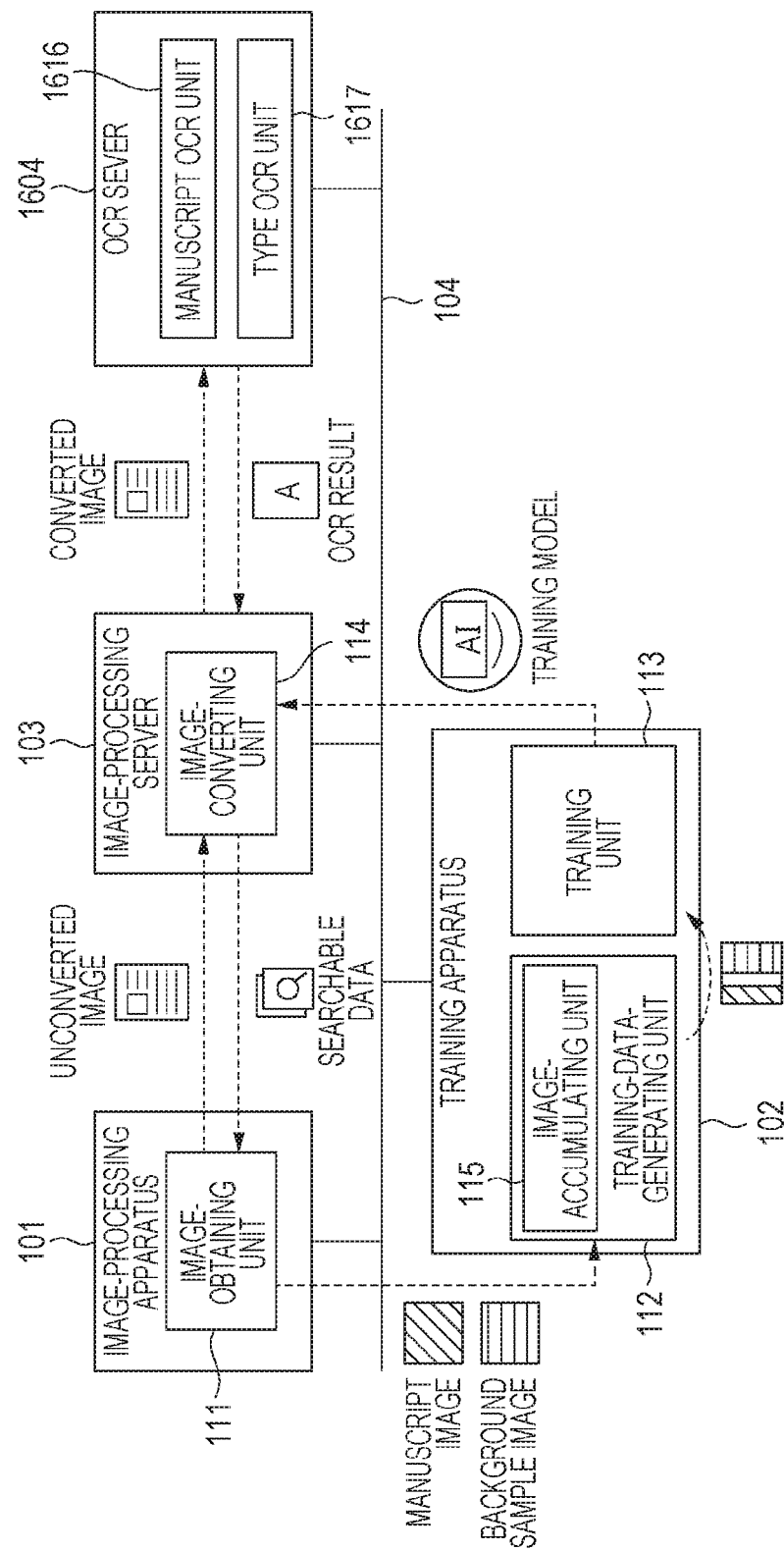
FIG. 16A illustrates the structure of an image-processing system according to a fifth embodiment.

According to the present embodiment, the image-processing system includes an additional device. FIG. 16A illustrates the structure of the image-processing system according to the fifth embodiment. An image-processing system 1600 includes an OCR server 1604 in addition to the image-processing apparatus 101, the training apparatus 102, and the image-processing server 103.

The image-processing apparatus 101, the training apparatus 102, and the image-processing server 103 are the same as those described with reference to FIG. 1. The OCR server 1604 functions as a type OCR unit 1617 and a manuscript OCR unit 1616.

The manuscript OCR unit 1616 performs OCR on the manuscript character that is contained in the image to be processed. The manuscript OCR unit 1616 receives, from the image-processing server 103, the image to be processed and information about a region (the region is referred below to a "manuscript OCR region") that is in the image to be processed and that contains the manuscript character on which the OCR is performed. An OCR process is performed on the manuscript OCR region in the scanned image to obtain text data. The manuscript OCR unit 1616 transmits the text data to the image-processing server 103.

The type OCR unit 1617 can perform OCR (optical character recognition) on type that is contained in the image to be processed. The type OCR unit 1617 receives, from the image-processing server 103, the image to be processed and information about a region (the region is referred bellow as a "type OCR region") that is in the image to be processed and that contains the type on which the OCR is performed. The OCR is performed on the type OCR region in the image to be processed to obtain text data. The text data is transmitted to the image-processing server 103.

Sequence of Use

Figure 16B:
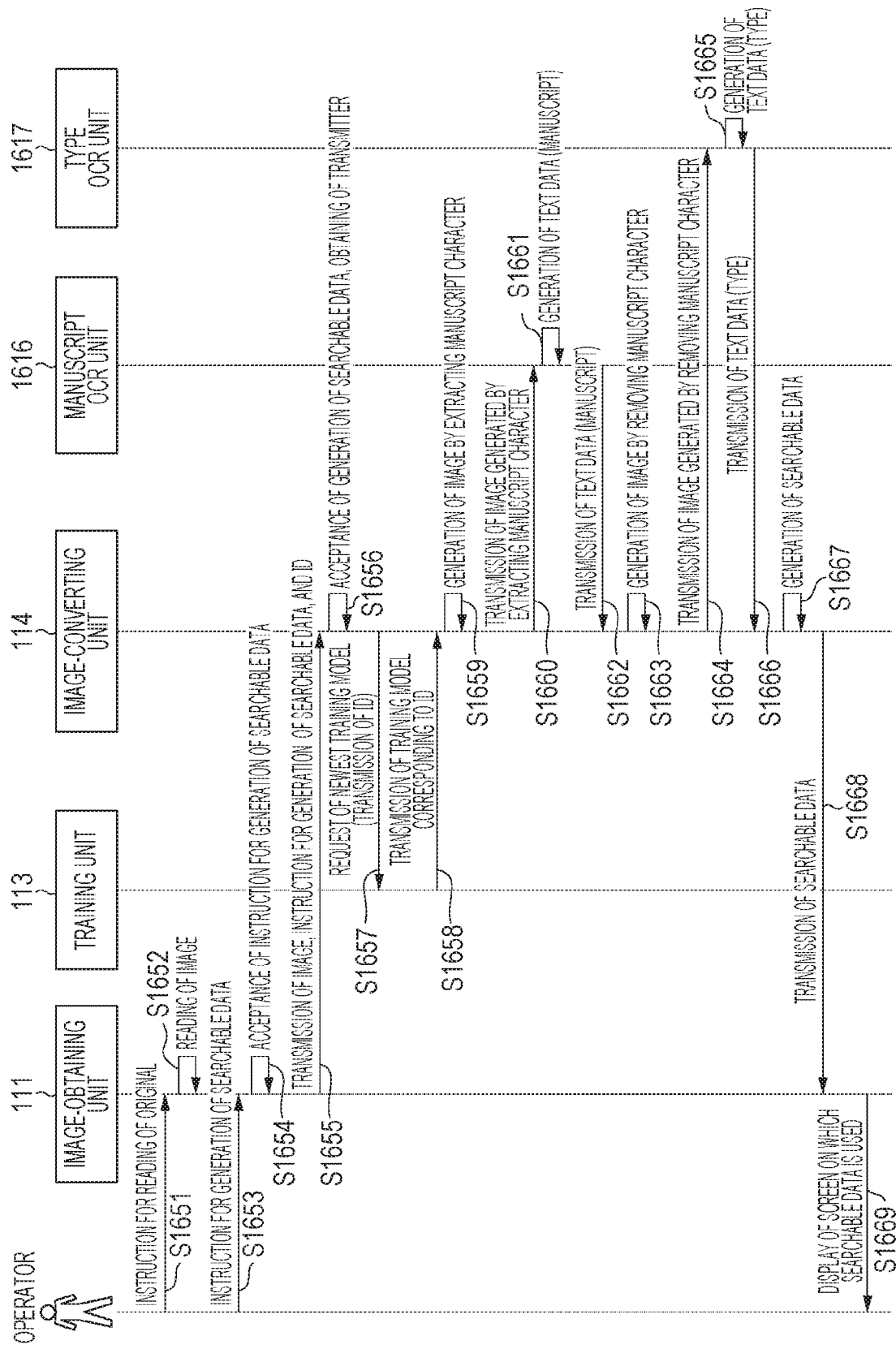
FIG. 16B illustrates the sequence of use of the image-processing system according to the fifth embodiment.

The sequence of use of the system will be described. FIG. 16B illustrates the sequence of use of the image-processing system according to the fifth embodiment.

Figure 23A:
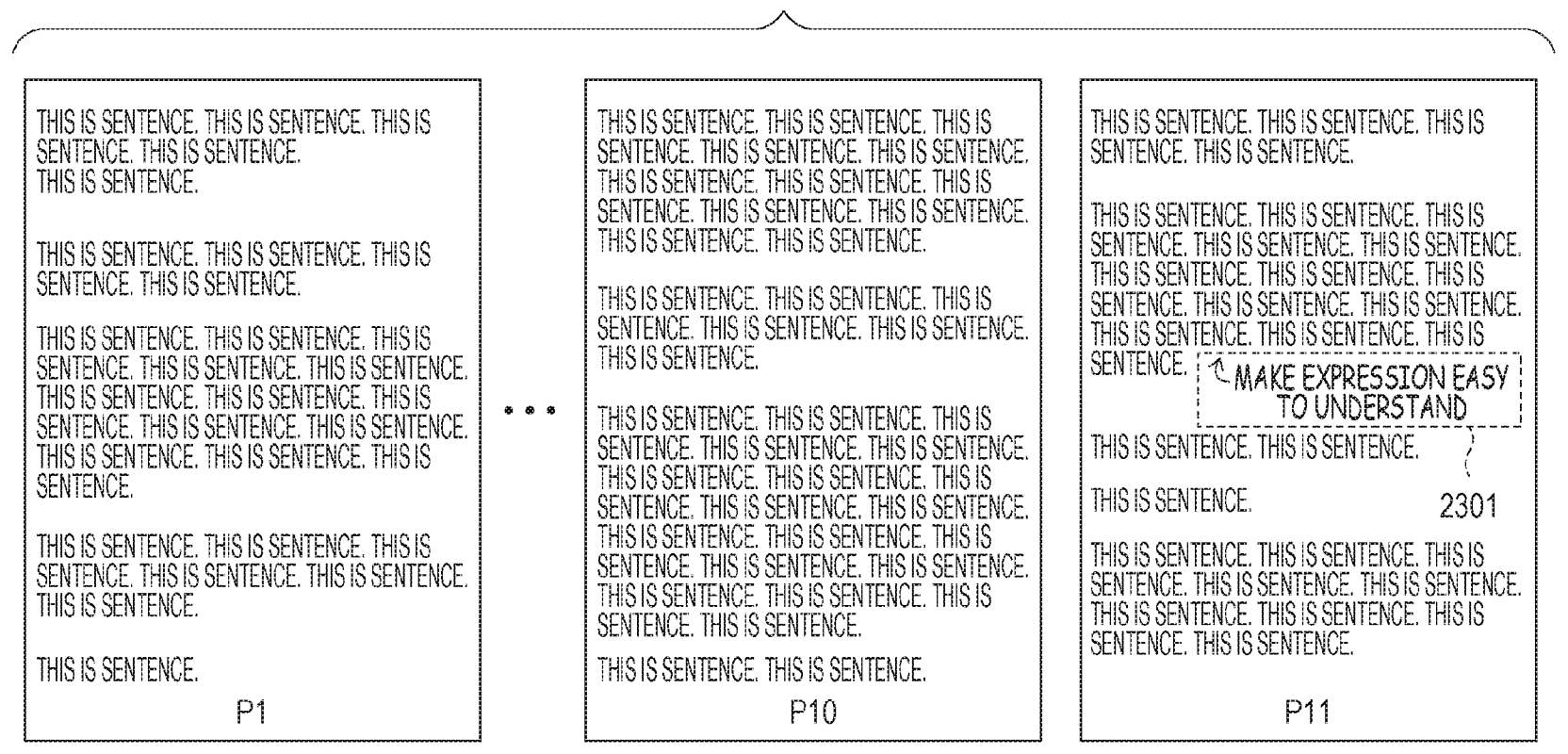

When the operator gives an instruction for reading of the image to be processed at S1651, the image-obtaining unit 111 reads the image to be processed and attaches a flag of an object to be processed to the image (S1652). The image that is read belongs to, for example, an image group illustrated in FIG. 23A. The image group illustrated in FIG. 23A contains a manuscript character 2301 in an image on the eleventh page. The image may be a form original 2400 illustrated in FIG. 24. The form original 2400 includes the name entry column 1201, the address entry column 1202, and the phone number entry column 1203. The name, the address, and the phone number are entered therein in manuscript.

When the operator gives an instruction for generation (instruction for conversion) of searchable data at S1653, the image-obtaining unit 111 obtains information about the instruction for generation of the searchable data (S1654).

The image to be processed that is read as above is transmitted to the image-converting unit 114 together with the information about the instruction (S1655). At this time, ID information is preferably attached to the transmitted data.

The image-converting unit 114 receives the data and accepts an instruction for processing of the manuscript character (S1656). At this time, the image-converting unit 114 learns that the image-obtaining unit 111 is a destination to which the data is replied. The image-converting unit 114 that accepts the instruction for processing of the manuscript character requests a newest training model from the training unit 113 (S1657). In response to this, the training unit 113 transmits the newest training model to the image-converting unit 114. In the case where the ID information is designated in the request from the image-converting unit 114, the training model corresponding to the ID information is transmitted (S1658). The image-converting unit 114 performs a process (identification process) of extracting the manuscript character from the unconverted image on the basis of the obtained training model (S1659). The manuscript image that is generated in the extracting process and that contains only the manuscript character is transmitted to the manuscript OCR unit 1616. The manuscript OCR unit 1616 performs the manuscript OCR process on the manuscript image to obtain the text data (manuscript) (S1661). The manuscript OCR unit 1616 transmits the obtained text data (manuscript) to the image-converting unit 114 (S1662). Subsequently, the image-converting unit 114 generates a type image by removing the manuscript character from the image to be processed (S1663). The type image is transmitted to the type OCR unit 1617 (S1664). The type OCR unit 1617 that obtains the type image performs the type OCR process on the type image to obtain the text data (type) (S1665). The obtained text data (type) is transmitted to the image-converting unit 114 (S1666). Subsequently, the image-converting unit 114 generates the searchable data at least on the basis of the text data (manuscript) and the text data (type) (S1667). The image-converting unit 114 transmits the searchable data to the image-obtaining unit 111 (S1668). The image-obtaining unit 111 that obtains the searchable PDF data provides a screen on which the searchable data is used to the operator (S1669).

Operation Screen

Figure 23B:
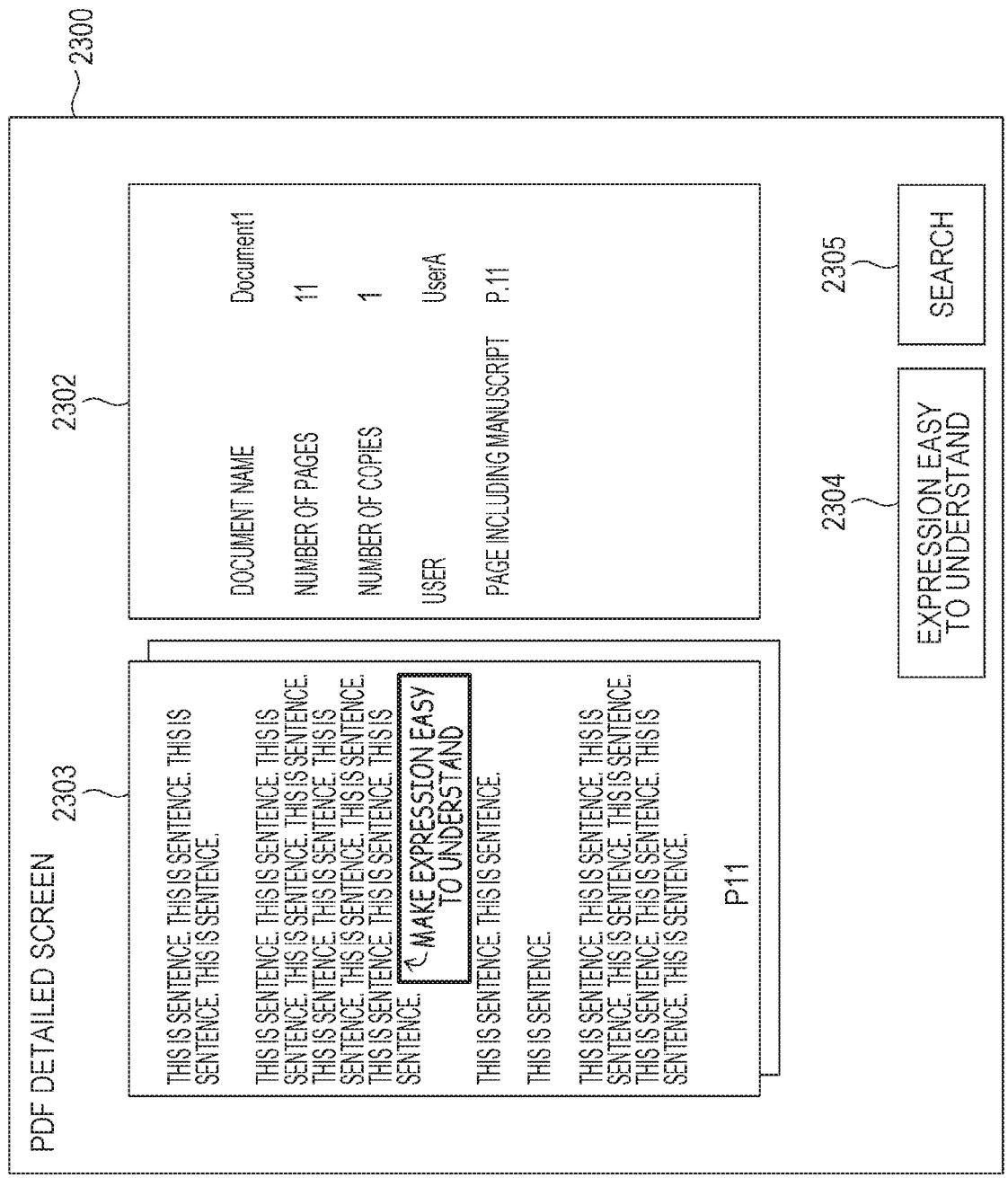
FIG. 23B illustrates an operation screen on which searchable PDF is operated.
Figure 24:
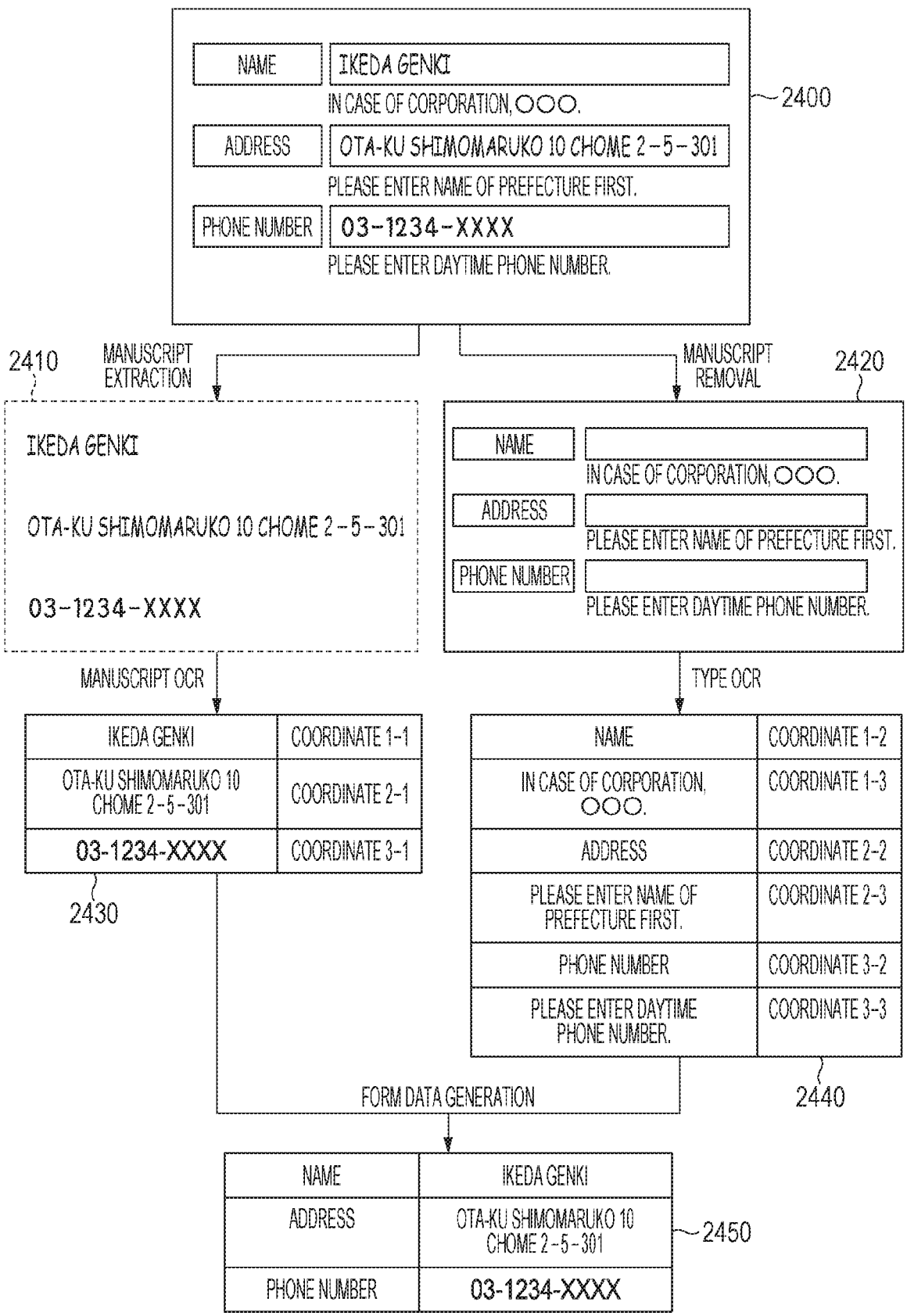
FIG. 24 illustrates an outline of a form data generating process.

A method of using the searchable data according to the present embodiment will now be described. FIG. 23B illustrates an operation screen on which the searchable PDF is operated.

When the process of obtaining the searchable PDF is completed, an operation screen 2300 is displayed on the display device 210 of the image-processing apparatus 101. The searchable PDF that is accumulated may be displayed on the screen when the searchable PDF is designated on a list screen (not illustrated). The operation screen includes a detailed information region 2302, a preview region 2303, an input column 2304, and a search button 2305.

In the detailed information region 2302, detailed information of a PDF file such as a document name, the number of pages, the number of copies, and a username is displayed. According to the present embodiment, the information about the page structure is also extracted. Accordingly, an item of "PAGE INCLUDING MANUSCRIPT", which is information representing that which page includes the manuscript character, is also displayed.

In the preview region 2303, the preview image of the PDF data is displayed.

In the input column 2304, a character can be freely inputted by user operation. The character is inputted by using, for example, a software keyboard (not illustrated) or an external hardware keyboard.

The search button 2305 is used to start character search in the PDF data. When the search button 2305 is selected with an "expression easy to understand" inputted in the input column 2304, the preview image on the eleventh page is displayed in the preview region 2303. In the preview image, the manuscript character 2301 is highlighted (for example, emphasized by a red frame). A highlighting process is performed with the text data that is obtained by the OCR associated with information about coordinates in the image (an x-attribution, a y-attribution, a width-attribution, and a height-attribution).

Data Generation Requesting Process

Figure 17A:
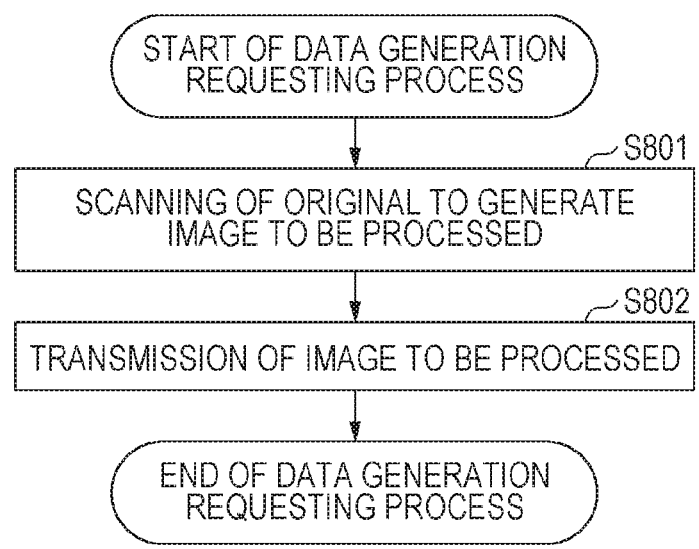
FIG. 17A illustrates the flow of a data generation requesting process.

A data generation requesting process of the image-processing apparatus 101 will now be described. FIG. 17A illustrates the flow of the data generation requesting process. The process is performed in a manner in which the CPU 201 of the image-processing apparatus 101 reads a control program that is recorded in the storage 208 and loads the control program onto the RAM 204. This is started when the user carries out predetermined operation by using the input device 209 of the image-processing apparatus 101.

The processing steps of the processes at S801 and S802 are the same as the processing steps designated by the same reference characters in the flowchart in FIG. 8A. According to the present embodiment, information about a request for a searchable data generating process is given in the wake of transmission of the image to be processed. Example of the information about the request include a request for generation of the searchable PDF and a request for generation of the form data.

Data Generating Process

Figure 17B:
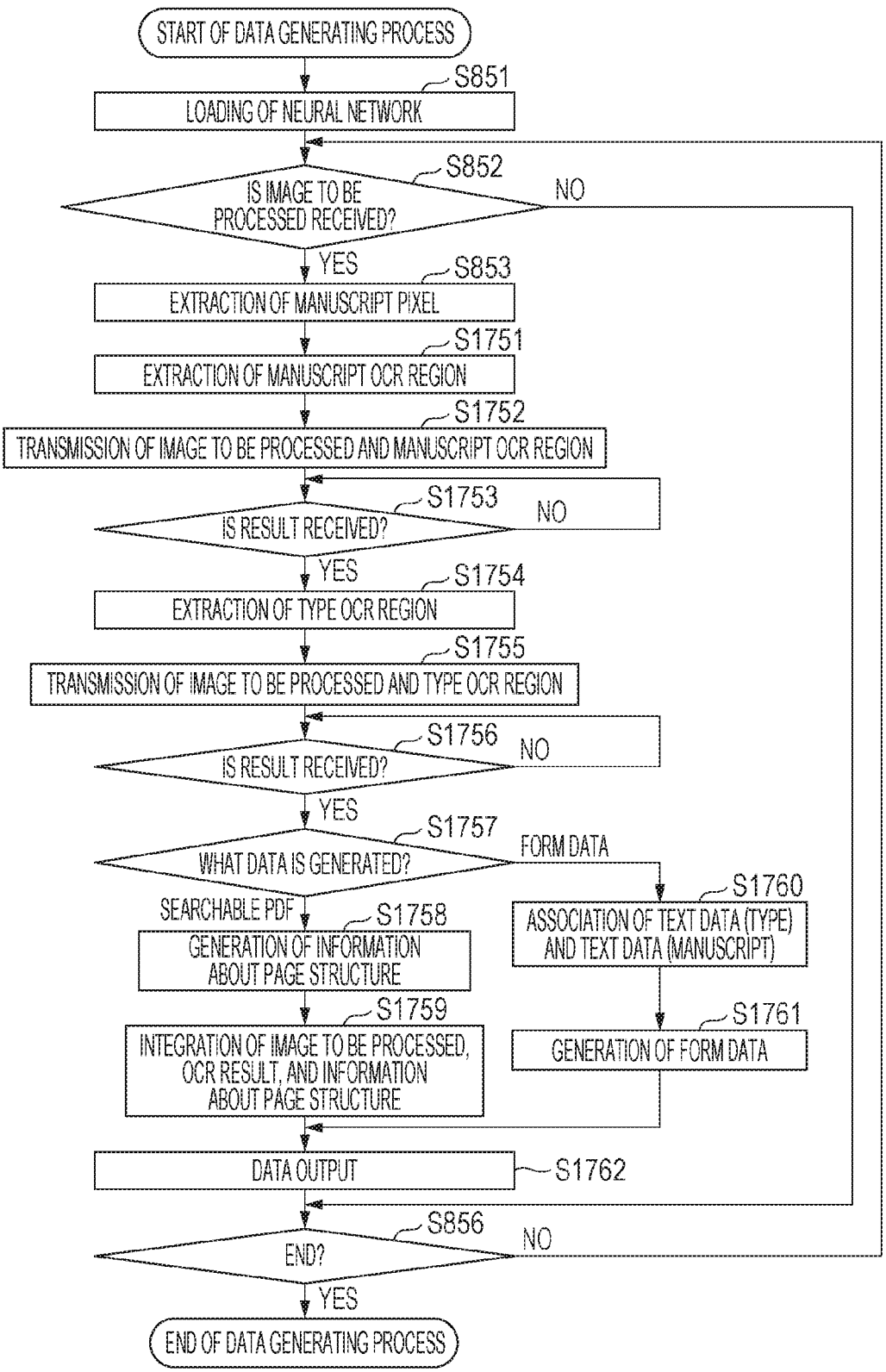
FIG. 17B illustrates the flow of an OCR process.

The OCR process of the image-processing server 103 will now be described. FIG. 17B illustrates the flow of the data generating process. The image-processing server 103 that functions as the image-converting unit 114 receives the image to be processed from the image-processing apparatus 101 and performs the OCR on the type or the manuscript character that is contained in the scan image data to obtain the text data. The type OCR unit 1617 performs the OCR on the type. The manuscript OCR unit 1616 performs the OCR on the manuscript character. FIG. 17B illustrates the flowchart of the OCR process. The process is performed in a manner in which the CPU 261 reads an image processing server program that is stored in the storage 265 and loads the image processing server program onto the RAM 264. This is started when the user powers ON the image-processing server 103.

The processing steps of the processes at S851, S852, and S853 are the same as the processing steps designated by the same reference characters in the flowchart in FIG. 8B.

At S1751, the CPU 261 extracts the manuscript OCR region from the image to be processed. The CPU 261 extracts and evaluates a portion at which the pixels represented as being the manuscript are connected to each other, and the circumscribed rectangles thereof in the same manner as the process at S1107 in the flowchart illustrated in FIG. 11 with respect to the manuscript-extracted image that is obtained at S853. Thus, the partial region that contains the manuscript character is extracted. A region that is in the image to be processed and that has the position and size corresponding to those of the partial region in the manuscript-extracted image corresponds to the manuscript OCR region.

At S1752, the CPU 261 transmits the image to be processed and the manuscript OCR region extracted at S1751 to the manuscript OCR unit 1616 via the external interface 268, and the manuscript OCR is performed. The manuscript OCR can be performed by using a known technique.

At S1753, the CPU 261 determines whether a manuscript OCR result is received from the manuscript OCR unit 1616. The manuscript OCR result means the text data that is obtained by recognizing the manuscript character that is contained in the manuscript OCR region by the manuscript OCR unit 1616. If the manuscript OCR result is received from the manuscript OCR unit 1616 via the external interface 268, the result of determination is YES, and the flow proceeds to S1754. If not, the process at S1753 is repeated.

At S1754, the CPU 261 extracts the type OCR region from the image to be processed. The CPU 261 extracts and evaluates the connected black pixels and the circumscribed rectangles thereof in the same manner as the process at S1102 in the flowchart in FIG. 11 with respect to the image to be processed to extract the partial region that contains the type. At this time, the manuscript OCR region that is extracted at S1751 is excluded from the image to be processed.

At S1755, the CPU 261 transmits the image to be processed and the type OCR region extracted at S1754 to the type OCR unit 1617 via the external interface 268, and the type OCR is performed. The type OCR can be performed by using a known technique.

At S1756, the CPU 261 determines whether a type OCR result is received from the type OCR unit 1617. The type OCR result means the text data that is obtained by recognizing the type that is contained in the type OCR region by the type OCR unit 1617. If the type OCR result is received from the type OCR unit 1617 via the external interface 268, the result of determination is YES, and the flow proceeds to S1757. If not, the process at S1756 is repeated.

At S1757, the CPU 261 determines the content of the request. If the content of the request is generation of the searchable PDF, the CPU 261 performs the process at S1758. If the content of the request is generation of the form data, the CPU 261 performs the process at S1760. A searchable PDF generating process and a form data generating process will be described in detail.

Searchable PDF Generating Process

The searchable PDF generating process of the image-processing server 103 will now be described. FIG. 15A and FIG. 15B illustrate information about a manuscript detection result. In the case where the button 2104 is selected on the operation screen 2100, the searchable PDF generating process is requested. As illustrated in, for example, FIG. 23B, the searchable PDF generating process is requested when the original having pages that contain the manuscript character is read.

When the content of the request is the searchable PDF generating process, the CPU 261 performs a process of generating the information about the page structure at S1758. The CPU 261 performs a process of detecting the manuscript character as a piece of the information about the page structure. In the process, the CPU 261 extracts a portion at which pixels that are presumed to be the manuscript are connected to each other in the manuscript-extracted image. The circumscribed rectangles thereof are created, and the shape and size of each rectangle and the distance between the rectangles are evaluated. Thus, a rectangle that contains a set of blocks of the manuscript pixels such as a manuscript word or sentence can be obtained. The rectangle corresponds to the manuscript region. The CPU 261 generates XML data representing the information about the manuscript detection result and inserts tags of "<handwriting>" the number of which is equal to the number of the obtained manuscript regions. In each tag of "<handwriting>", the x-attribution and the y-attribution are added, and the x-coordinate value and the y-coordinate value of the start point of the corresponding manuscript region are recorded. In addition, the width-attribution and the height-attribution are added, and the number of the pixels of the height and the number of the pixels of the width of the corresponding manuscript region are recorded. This is illustrated in FIG. 15A. In the case where no manuscript pixel is included in the manuscript-extracted image, the manuscript region is not obtained, and the tags of "<handwriting>" are not inserted into the information about the manuscript detection result. This is illustrated in FIG. 15B. The CPU 261 thus detects the manuscript character and adds the manuscript character into the information about the page structure.

At S1759, the CPU 261 integrates the image to be processed, the OCR result (the manuscript and the type), and the information about the page structure to generate the searchable PDF. At S1762, the generated searchable PDF is transmitted to the image-obtaining unit 111.

Form Data Generating Process

The form data generating process will now be described in detail. In the case where the button 2103 is selected on the operation screen 2100, the form data generating process is requested. As illustrated in, for example, FIG. 24, the form data generating process is requested when the form original 2400 in which the manuscript character is entered is read. In this case, a manuscript extraction image 2410 is generated at S1659, and a manuscript removal image 2420 is generated at S1663. That is, the region that contains the manuscript characters that are entered in the name entry column 1201, the address entry column 1202, and the phone number entry column 1203 is extracted as the manuscript OCR region. The region that contains the type that is printed in the name headline 1204, the address headline 1205, and the phone number headline 1206 is extracted as the type OCR region.

At S1760, the CPU 261 integrates the manuscript OCR result and the type OCR result that are received from the manuscript OCR unit 1616 and the type OCR unit 1617.

The CPU 261 evaluates the positional relationship of the former manuscript OCR region and type OCR region and the semantic relationship of the text data that corresponds to the manuscript OCR result and the type OCR result to presume the relationship between the manuscript OCR result and the type OCR result. The presumption is based on a manuscript coordinate table 2430 and a type coordinate table 2440.

The manuscript OCR region in the name entry column 1201 is specified as the manuscript OCR region nearest to the type OCR region in the name headline 1204. In addition to this, when the text data that corresponds to the manuscript OCR result of the manuscript OCR region is a character string that includes the name of a person, this can be specified as the name. Accordingly, the type OCR result and the manuscript OCR result are evaluated as the relationship of a pair of a value and an item related to the name. Similarly, regarding the address, from the distance between the type OCR region and the manuscript OCR region, and the fact that the manuscript OCR result includes the name of a place, the relationship between these is evaluated. Regarding the phone number, from the distance between the type OCR region and the manuscript OCR region, and the fact that the manuscript OCR result is composed of numerals, the relationship between these is evaluated. The manuscript OCR result and the type OCR result are thus integrated into one or more parts of items and values, and form data 2450 (table data) is generated (S1761). At S1762, the generated form data is transmitted to the image-obtaining unit 111. The form data is used as document data that can be processed in, for example, a business process.

Remark

As described above according to the present embodiment, the use of the training result of the neural network enables useful information to be extracted from the image to be processed. For example, the manuscript OCR region is extracted from the scan image data, and the manuscript OCR can be performed. The manuscript OCR region can be extracted and inputted into the manuscript OCR process for processing, and it is not necessary for the manuscript OCR region to be preregistered for every form. For an irregular form that cannot be preregistered, the manuscript OCR region can be extracted and inputted into the manuscript OCR process for processing, and it is not necessary for a person to designate the manuscript OCR region. In addition, the original that contains the manuscript can be detected from originals by extracting the manuscript from the scan image data. Accordingly, the original that contains the manuscript can be readily detected from many irregular originals such as corrected originals.

OTHER EMBODIMENTS

The present disclosure can also be carried out in a manner in which the system or an apparatus is provided with a program for performing one or more functions according to the above embodiments via a network or a storage medium, and one or more processors of a computer of the system or the apparatus read and execute the program. The present disclosure can also be carried out by a circuit (for example, an ASIC) for performing one or more functions.

The present disclosure may be used for a system that includes devices or an apparatus that includes a single device. For example, according to the embodiments, the training apparatus 102 functions as the training-data-generating unit 112 and the training unit 113. However, other apparatuses may separately function as the training-data-generating unit 112 and the training unit 113. In this case, the apparatus that functions as the training-data-generating unit 112 transmits the training data that is generated by the training-data-generating unit 112 to the apparatus that functions as the training unit 113. The training unit 113 trains the neural network on the basis of the received training data. In the above description, the image-processing apparatus 101 and the image-processing server 103 are different apparatuses. However, the image-processing apparatus 101 may have the function of the image-processing server 103. In the above description, the image-processing server 103 and the OCR server are different apparatuses. However, the image-processing server 103 may have the function of the OCR server.

The present disclosure is not limited to the above embodiments. Various modifications (including an organic combination of the embodiments) can be made on the basis of the spirit of the present disclosure and are not excluded from the range of the present disclosure. That is, the present disclosure includes all of the combinations of the above embodiments and modifications.

According to the embodiments, the training data is generated in the training data generating process. However, a large amount of pieces of the training data may be generated in the training data generating process in advance, and a mini-batch size of the training data may be sampled therefrom during the training process at any time.

According to the embodiments, the input image is generated as a grayscale image. However, the input image may be generated as an image having another format such as a full color image.

According to the embodiments, the manuscript character image is used as the foreground sample image to perform the training process for detecting the manuscript character. However, another image may be used as the foreground sample image. For example, an image of an original on which a seal is putted may be captured as the foreground sample image. This enables the neural network that is generated to detect the seal. Thin paper may be scanned from a back surface opposite a printed surface to obtain a foreground image, which can be used as the foreground sample image. This enables the neural network that is generated to detect a show-through pixel.

Figure 14B:
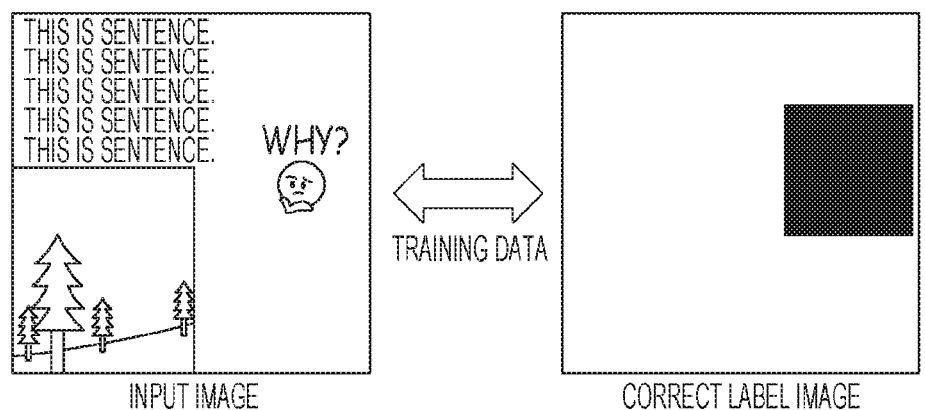
FIG. 14B illustrates a modification to the training data.
Figure 14C:
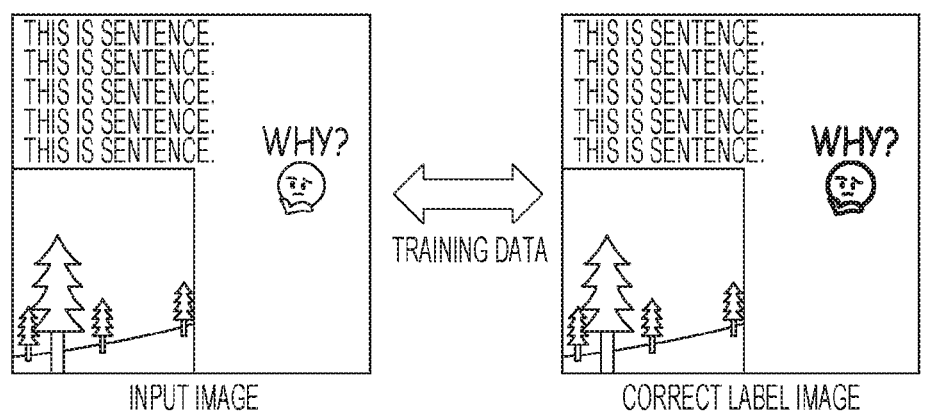
FIG. 14C illustrates a modification to the training data.
Figure 14D:
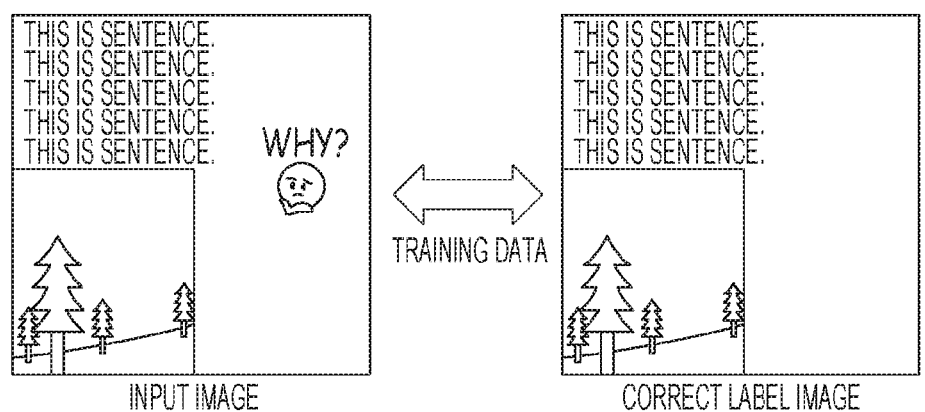
FIG. 14D illustrates a modification to the training data.

According to the embodiments, a pair of the images illustrated in FIG. 14A is used as the training data for training. However, a pair of different kinds of images may be used for training. For example, a pair of the images illustrated in FIG. 14B may be used as the training data. FIG. 14B illustrates a modification to the training data. As illustrated in FIG. 14B, the correct label image that is obtained by filling the rectangular region of the manuscript character in the input image with black is registered. Such training data enables training for which the rectangular region of the manuscript character can be extracted. Detection of the rectangular region of the manuscript character enables broad processing such as removal of the manuscript character to be done. A pair of the images illustrated in FIG. 14C may be used as the training data. As illustrated in FIG. 14C, the correct label image that is obtained by emphasizing the manuscript character in the input image is registered. Such training data enables training for emphasizing the manuscript character. That is, although the training data is not versatile unlike the training data in FIG. 14A, the image in which the manuscript character is emphasized can be obtained with a small number of steps. A pair of the images illustrated in FIG. 14D may be used as the training data. As illustrated in FIG. 14D, the correct label image that is obtained by deleting the manuscript character in the input image is registered. Such training data enables training for deleting the manuscript character. That is, although the training data is not versatile unlike the training data in FIG. 14A, the image in which the manuscript character is deleted can be obtained with a small number of steps. A neural network technique called Image-to-Image is used for image conversion with the data illustrated in FIG. 14C and FIG. 14D instead of the FCN at S701.

The definitions of abbreviations described in the embodiments are as follows. The MFP is an abbreviation for a multi-function peripheral. The ASIC is an abbreviation for an application specific integrated circuit. The CPU is an abbreviation for a central processing unit. The RAM is an abbreviation for a random-access memory. The ROM is an abbreviation for a read only memory. The HDD is an abbreviation for a hard disk drive. The SSD is an abbreviation for a solid state drive. The LAN is an abbreviation for local area network. The PDL is an abbreviation for a page description language. The PDF is an abbreviation for portable document format. The OS is an abbreviation for an operating system. The PC is an abbreviation for a personal computer. The OCR is an abbreviation for optical character recognition or reader. The CCD is an abbreviation for a charge-coupled device. The LCD is an abbreviation for a liquid crystal display. The ADF is an abbreviation for an auto document feeder. The CRT is an abbreviation for a cathode ray tube. The DPI is an abbreviation for dots per inch. The GPU is an abbreviation for a graphics processing unit. The ID is an abbreviation for identification.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-237512, filed Dec. 19, 2018, which is hereby incorporated by reference herein in its entirety.

What is claimed is:

1. A method for training a neural network that is used for predetermined image processing, the method comprising:
    generating a composite image by pasting a part of a manuscript sample image at a manuscript region included in the composite image and by pasting a part of a background sample image at a background region included in the composite image, wherein the composite image further includes a margin region between the manuscript region and the background region;
    generating a correct image corresponding to the composite image based on the part of the manuscript sample image; and
    training a neural network using the generated composite image and the generated correct image, wherein
    the trained neural network is used for performing the predetermined image processing on a captured image of an original that contains a manuscript character.

2. The method according to claim 1,
    wherein, in the predetermined image processing, an image for specifying a pixel position of the manuscript character in the captured image is generated by using the neural network.

3. The method according to claim 2, further comprising:
    generating an image by removing the manuscript character in the captured image on a basis of the image for specifying the pixel position of the manuscript character.

4. The method according to claim 2, further comprising:
    specifying a region on which a manuscript OCR process is to be performed in the captured image on a basis of the image for specifying the pixel position of the manuscript character.

5. The method according to claim 2, further comprising:
    storing, in a storage area, information representing that the captured image contains the manuscript character on a basis of the image for specifying the pixel position of the manuscript character.

6. The method according to claim 1,
    wherein, in the predetermined image processing, an image for specifying, in the captured image, a rectangular region that contains the manuscript character is generated by using the neural network.

7. The method according to claim 1,
    wherein, in the predetermined image processing, an image emphasizing the manuscript character in the captured image is generated by using the neural network.

8. The method according to claim 1,
    wherein, in the predetermined image processing, an image removing the manuscript character in the captured image is generated by using the neural network.

9. The method according to claim 1,
    wherein, in the generation of the composite image, the part of the manuscript sample image is pasted at the manuscript region after changing at least one of magnification and luminance for the manuscript sample image.

10. The method according to claim 1,
    wherein, in the generation of the composite image, the part of the background sample image is pasted at the background region after changing at least one of rotation angle, magnification and luminance for the background sample image.

11. The method according to claim 1,
    wherein, in the generation of the composite image, the sizes of the manuscript region, the background region and the margin region are randomly selected from a predetermined range.

12. A system comprising:
   at least one memory storing instructions; and
   at least one processor that, by execution of the instructions, is configured to
   generate a composite image by pasting a part of a manuscript sample image at a manuscript region included in the composite image and by pasting a part of a background sample image at a background region included in the composite image, wherein the composite image further includes a margin region between the manuscript region and the background region;
   generate a correct image corresponding to the composite image based on the part of manuscript sample image; and
   train a neural network using the generated composite image and the generated correct image, wherein
   the trained neural network is used for performing predetermined image processing on a captured image of an original that contains a manuscript character.

13. The system according to claim 12, wherein the at least one processor executes the instructions to:
   obtain the captured image by capturing the original; and
   perform the predetermined image processing on the captured image using the trained neural network.

14. The system according to claim 13,
   wherein, in the predetermined image processing, an image for specifying a pixel position of the manuscript character in the captured image is generated by using the neural network.

15. A non-transitory computer readable storage medium for storing instructions that causes a computer to perform:
   generate a composite image by pasting a part of a manuscript sample image at a manuscript region included in the composite image and by pasting a part of a background sample image at a background region included in the composite image, wherein the composite image further includes a margin region between the manuscript region and the background region;
   generate a correct image corresponding to the composite image based on the part of manuscript sample image; and
   train a neural network using the generated composite image and the generated correct image, wherein
   the trained neural network is used for performing predetermined image processing on a captured image of an original that contains a manuscript character.

16. The non-transitory computer readable storage medium according to claim 15, wherein the instructions causes a computer to further perform:
   obtain the captured image by capturing the original; and
   perform the predetermined image processing on the captured image using the trained neural network.

17. The non-transitory computer readable storage medium according to claim 15,
   wherein, in the predetermined image processing, an image for specifying a pixel position of the manuscript character in the captured image is generated by using the neural network.

\* \* \* \* \*